United States Patent
Hamamoto

(10) Patent No.: US 8,303,867 B2
(45) Date of Patent: Nov. 6, 2012

(54) METHOD FOR PRODUCING POLARIZER

(75) Inventor: Eiji Hamamoto, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1094 days.

(21) Appl. No.: 11/708,468

(22) Filed: Feb. 21, 2007

(65) Prior Publication Data

US 2008/0286455 A1    Nov. 20, 2008

(30) Foreign Application Priority Data

Feb. 24, 2006   (JP) .................. 2006-048830

(51) Int. Cl.
*B29D 11/00* (2006.01)
(52) U.S. Cl. .......... 264/1.34; 264/2.6; 264/2.7
(58) Field of Classification Search .......... 264/1.1, 264/1.34, 2.6, 2.7
See application file for complete search history.

(56) References Cited

U.S. PATENT DOCUMENTS

| | | | |
|---|---|---|---|
| 7,070,718 B2* | 7/2006 | Hamamoto ............ | 264/1.34 |
| 2002/0001700 A1* | 1/2002 | Sanefuji et al. ........... | 428/220 |
| 2003/0062645 A1 | 4/2003 | Nishida et al. | |
| 2004/0027663 A1 | 2/2004 | Hamamoto | |
| 2004/0212885 A1* | 10/2004 | Mizushima et al. ......... | 359/497 |
| 2005/0271873 A1* | 12/2005 | Kameyama et al. ......... | 428/343 |
| 2006/0098137 A1 | 5/2006 | Kameyama et al. | |
| 2009/0002608 A1 | 1/2009 | Kameyama et al. | |

FOREIGN PATENT DOCUMENTS

| | | |
|---|---|---|
| CN | 1598624 A | 3/2005 |
| CN | 1675569 A | 9/2005 |
| JP | 10-170721 A | 6/1998 |
| JP | 2002-326278 A | 11/2002 |
| JP | 2004-20635 A | 1/2004 |
| JP | 2004-70104 A | 3/2004 |
| JP | 2004-70348 A | 3/2004 |
| JP | 2005-074313 A | 3/2005 |
| JP | 2005-84505 A | 3/2005 |
| JP | 2005-84506 A | 3/2005 |
| JP | 2005-227650 A | 8/2005 |

OTHER PUBLICATIONS

Chinese Office Action dated Nov. 6, 2009, issued in corresponding Chinese Patent Application No. 200710005725.
Japanese Office Action dated Dec. 17, 2010, issued in corresponding Japanese Patent Application No. 2006-048830.
Korean Office Action dated Aug. 29, 2011, issued in corresponding Korean Patent Application No. 10-2007-0016809.
Korean Office Action dated Mar. 30, 2012, issued in corresponding Korean Patent Application No. 2007-0016809.

* cited by examiner

*Primary Examiner* — Mathieu D. Vargot
(74) *Attorney, Agent, or Firm* — Westerman, Hattori, Daniels & Adrian, LLP

(57) ABSTRACT

The invention relates to a method for producing a polarizer and to a polarizer produced by the production method. The invention also relates to a polarizing plate and an optical film each using the polarizer and to an image display such as a liquid crystal display, an organic electroluminescent display and a plasma display panel, each using the polarizing plate or the optical film. The invention further relates to a cleaning apparatus having a cleaning vessel for use in a cleaning process of a polarizer production method and to a cleaning system into which the cleaning apparatus is assembled.

19 Claims, 5 Drawing Sheets

[FIG. 1]
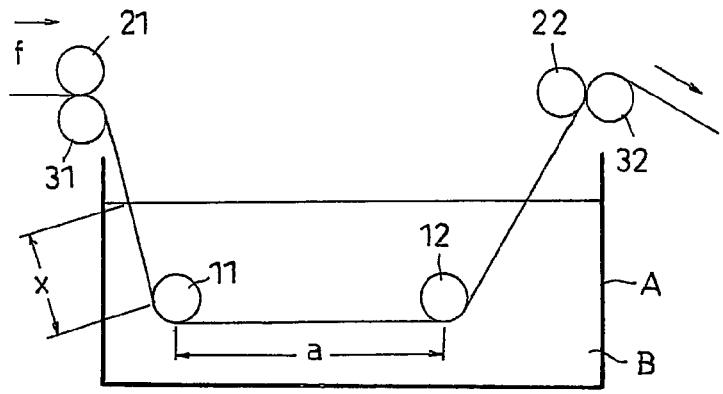
[FIG. 2]
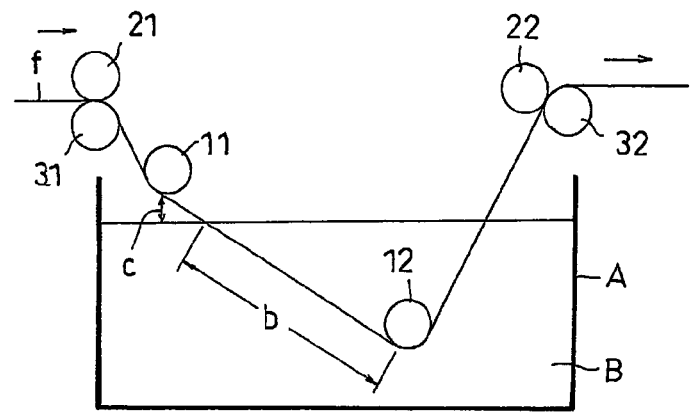
[FIG. 3]
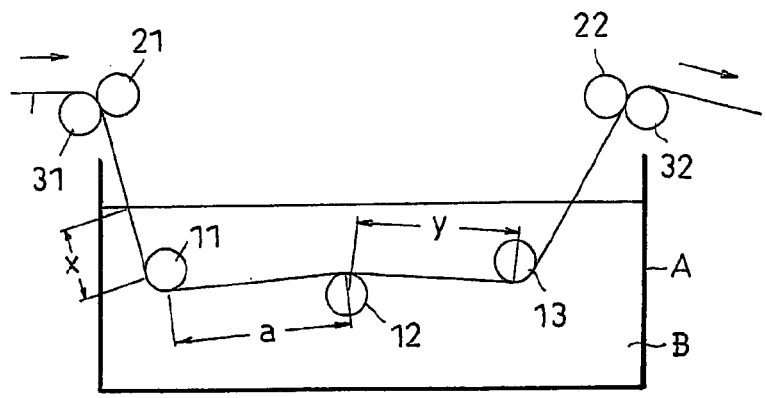

[FIG.4]
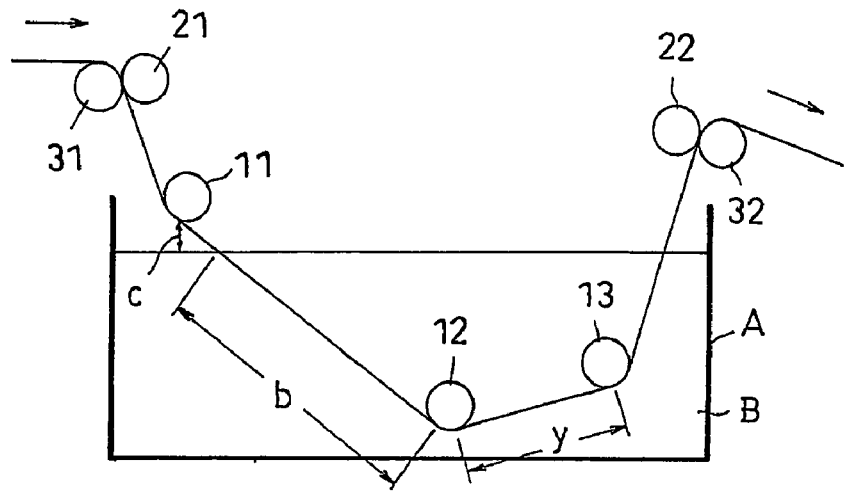
[FIG.5]
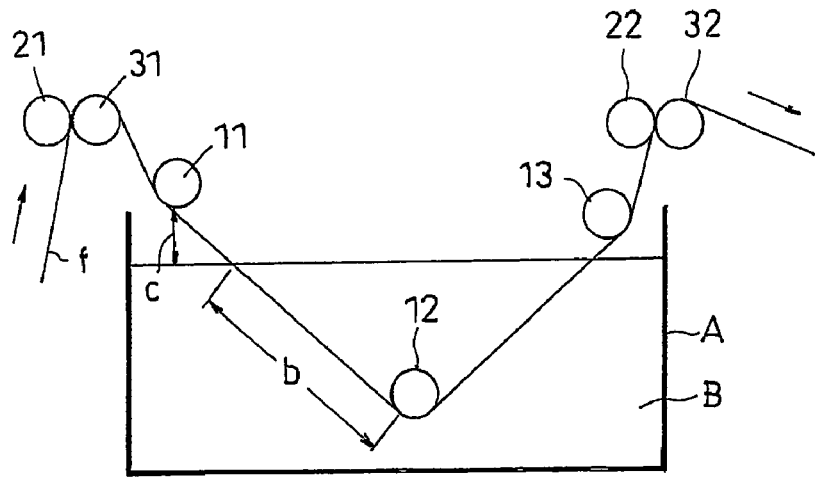
[FIG.6]
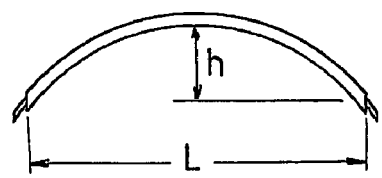

[FIG. 7A]
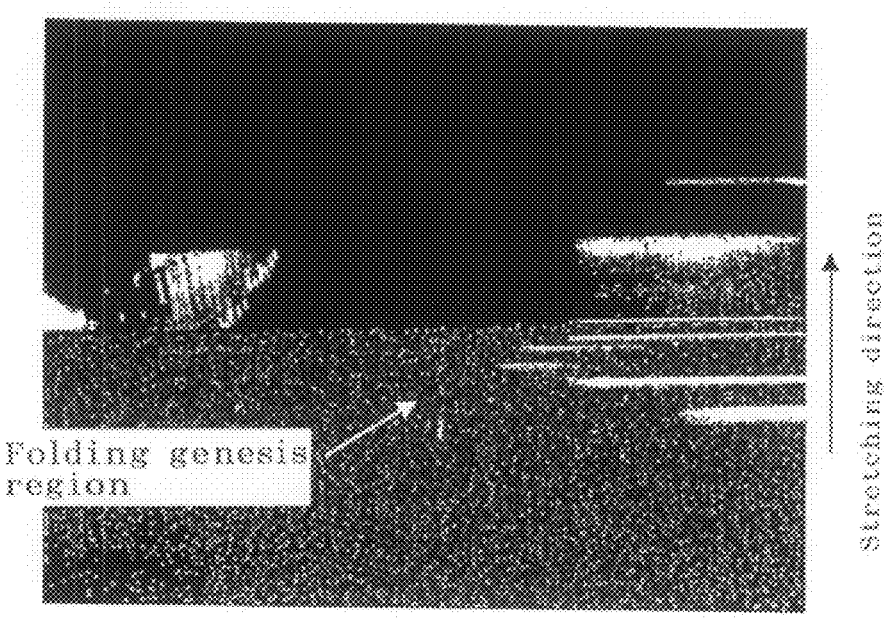
[FIG. 7B]
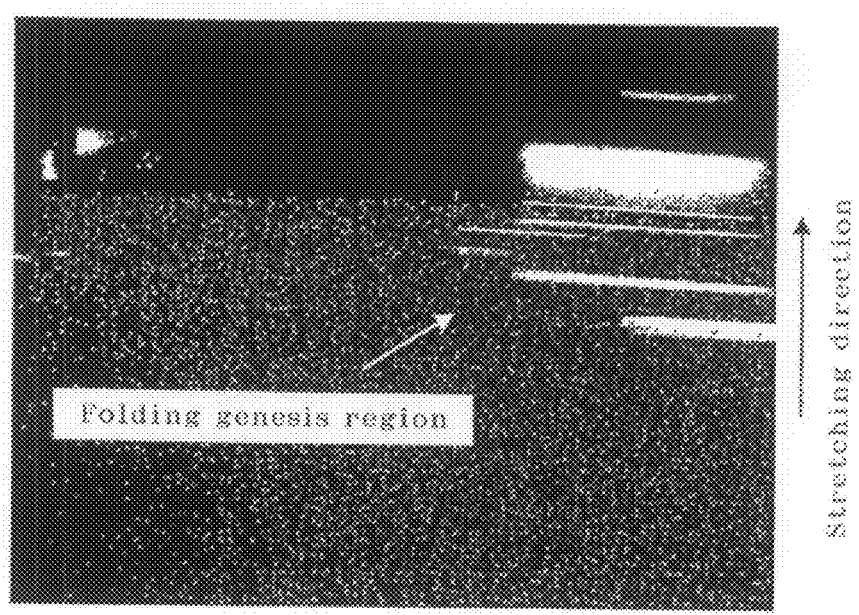

[FIG. 8A]
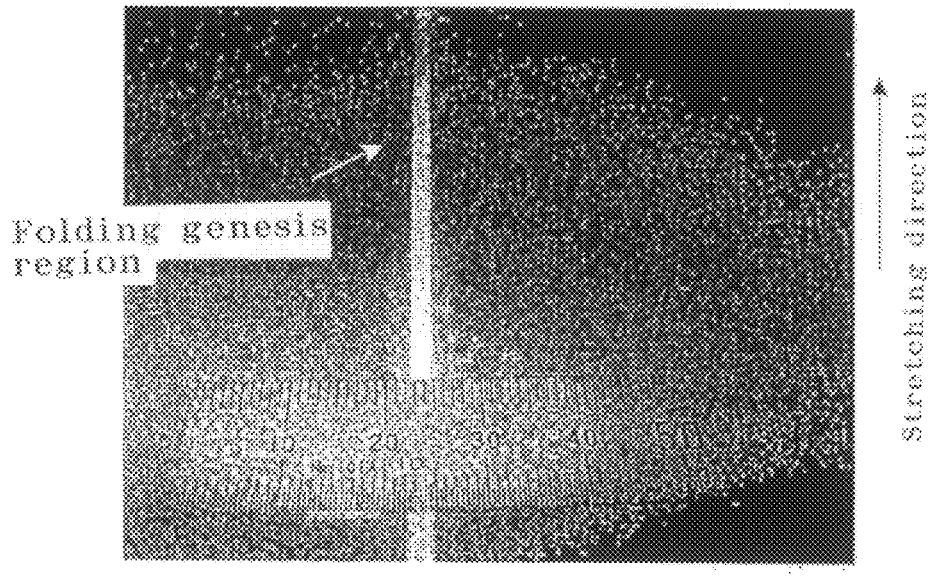
[FIG. 8B]
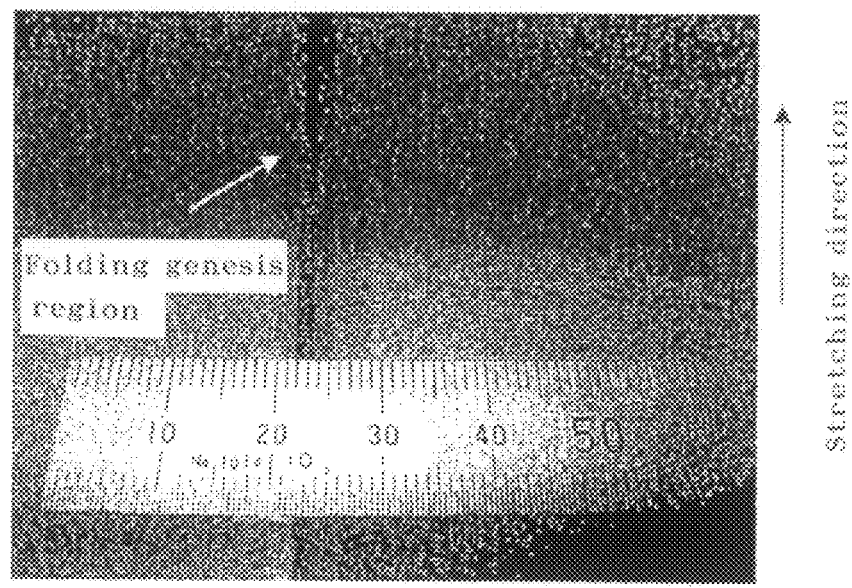

[FIG. 8C]
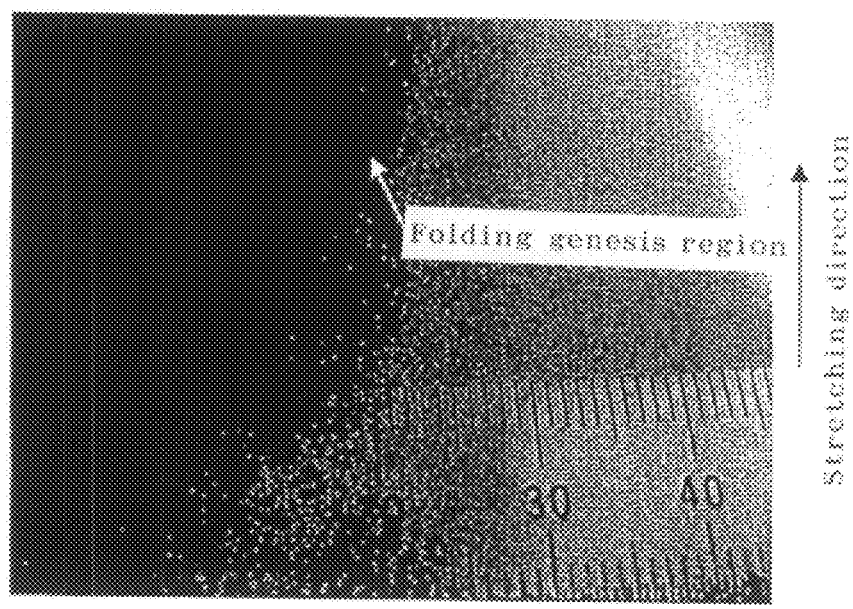
[FIG. 8D]
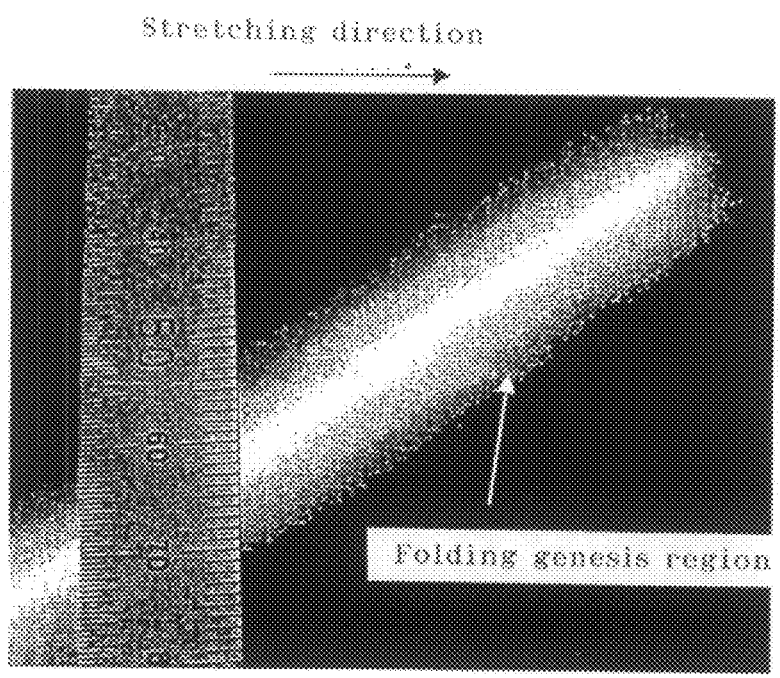

METHOD FOR PRODUCING POLARIZER

BACKGROUND OF THE INVENTION

1. Field of the Invention

The invention relates to a method for producing a polarizer and to a polarizer produced by the production method. The invention also relates to a polarizing plate and an optical film each using the polarizer and to an image display such as a liquid crystal display, an organic electroluminescent display and a plasma display panel, each using the polarizing plate or the optical film. The invention further relates to a cleaning apparatus having a cleaning vessel for use in a cleaning process of a polarizer production method and to a cleaning system into which the cleaning apparatus is assembled.

2. Description of the Related Art

Liquid crystal displays (LCDs) are used for personal computers, TVs, monitors, cellular phones, PDAs, and the like. Conventionally, a dyed polyvinyl alcohol film, which has both high transmittance and high polarization degree, is used as a polarizer for liquid crystal displays and the like. Such a polarizer is produced by allowing a polyvinyl alcohol film to swell and dyeing, crosslinking and stretching the film in baths. In general, the polarizer is laminated to a protective film such as a triacetyl cellulose film with an adhesive on one or both sides thereof and used in the form of a polarizing plate.

In recent years, as the size of LCDs increases, the size of polarizing plates for use therein increases. The increase in the size of LCDs is significant, and 65-inch products are commercially available. Even 80-inch products are presented in some exhibitions, and 65-inch or larger LCDs are expected to be commercially available. The increase in the size of LCDs leads to an increase in the size of equipment for manufacturing LCD polarizers for the purpose of improving the properties and quality of polarizers and increasing the efficiency of production of polarizers. The increase in the size of liquid crystal panels and the production of high-brightness or high-quality liquid crystal panels require not only high optical properties such as high transmittance and high polarization degree but also dyeing uniformity.

When a polyvinyl alcohol film is wet-stretched to form a polarizer, the processes for manufacturing the polarizer broadly fall into allowing the polyvinyl alcohol film to swell and dyeing, crosslinking and stretching the polyvinyl alcohol film. Practically, the stretching process is often performed together with any of the swelling, dyeing and crosslinking processes at the same time and thus is often inseparable from each of the other processes. In some cases, a cleaning process with a cleaning bath is performed before or after any of the swelling, dyeing and crosslinking processes. After the crosslinking process, a cleaning process with an aqueous iodide solution may be performed in order to stabilize the quality.

However, the increase in the size of polarizer manufacturing equipment causes various problems. For example, the polarizer manufacturing process causes a polyvinyl alcohol film to be folded in the flow direction (film folding) when the polyvinyl alcohol film is fed or stretched in a stretching bath in the step of wet-stretching the film. Particularly when the film passes through a guide roll in the stretching bath or passes through pinch rolls placed on both sides of the stretching bath, the folded portion of the film is pressed against the roll so that a problem occurs in which a linear stripe-like folding mark can remain in the portion, dyeing can cause a linear stripe in the portion, and the polyvinyl alcohol film in the folded state can be formed into a polarizer in which the portion forms a defect (damage).

Folding of a polyvinyl alcohol film does not often occur when the film width is around 1 m, but it becomes easy to occur as the film width increases. In particular, a film width of more than 2.5 m increases the occurrence, and a film width of more than 3 m makes the occurrence high and can cause a reduction in product yield. An increase in the length of the stretching bath also leads to an increase in the occurrence of film folding.

In the process of manufacturing a polarizer, the film folding can easily occur in a cleaning or swelling process where a polyvinyl alcohol film is placed in an aqueous solution for the first time.

Examples of methods for reducing the folding of a polyvinyl alcohol film in a stretching bath or at a guide roll include: reducing the amount of swelling of the polyvinyl alcohol film by lowering the temperature of the stretching bath; and reducing the width by increasing the stretch ratio in the stretching bath. For example, if a polyvinyl alcohol film is stretched at a stretch ratio of about 3 in a swelling process, film folding can be significantly reduced. In contrast, a reduction in the stretch ratio can significantly increase the occurrence of film folding. Generally, in order to provide good optical properties for a polarizer, the stretch ratio of a polyvinyl alcohol film is set small in the swelling process. Thus, there has been a demand for a method in which folding or buckling of a polyvinyl alcohol film can be prevented even when the stretch ratio is small in a cleaning or swelling process where the polyvinyl alcohol film is placed in an aqueous solution for the first time. In particular, film folding has become a big issue, because the size of polarizing plates and the size of equipment for manufacturing polarizers for use in the polarizing plates increase as the size of liquid crystal displays increases.

For example, when a 1 m-wide polyvinyl alcohol film expandable by 20% is allowed to swell and stretched at a stretch ratio of 1.2 in a swelling bath, the film expands by 20 cm in the width direction to become 1.2 m until the film passes through a first pinch roll, enters the swelling bath, passes through first and second guide rolls, and leaves a second pinch roll. Namely, the film should expand from both ends by 10 cm per each end. If the film, whose width is 1 m at the first guide roll, does not become 1.2 m when leaving the swelling bath through the second guide roll, film folding can occur. In the production of polarizers, the stretch ratio is generally set higher than 1.2 so that width reduction occurs to prevent film folding. However, if a film with a width of at least 3 m is used to meet the demand for upsizing of polarizers, expansion by 20% results in an extension by 60 cm in the width direction (30 cm per each of the right and the left) so that film folding can easily occur and that the prevention of folding of a polyvinyl alcohol film can be more difficult than with the 1 m-wide film. In order to prevent that, the width should be reduced by setting the stretch ratio higher than that for the 1 m-wide polyvinyl alcohol film. However, the higher stretch ratio in the swelling bath is not preferred, because it reduces the width of the resulting polarizer and degrades the optical properties (the relation between transmittance and polarization degree). Better optical properties (higher degree of polarization at the same transmittance) tend to be provided when the stretch ratio in the swelling bath is set low than when it is set high. Thus, the stretch ratio also should not be high.

Against the problems, it is proposed that an expander roll or a bend roll should be used as a guide roll in a cleaning bath for the swelling process (see Japanese Patent Application Laid-Open (JP-A) No. 2004-20635, No. 2005-84505, No. 2005-227650). The use of an expander roll or the like as a guide roll can reduce the problems to some extent, but the reduction effect is not sufficient.

SUMMARY OF THE INVENTION

It is an object of the invention to provide a method that can produce a polarizer with good optical properties from a polyvinyl alcohol film without causing the problem of film folding.

It is another object of the invention to provide a polarizer produced by the above production method, and to provide a polarizing plate and an optical film each using the polarizer. It is a further object of the invention to provide an image display using the polarizing plate or the optical film.

It is a further object of the invention to provide a cleaning apparatus or a cleaning system for use in the polarizer production method.

As a result of active investigations for solving the problems, the inventors have found that the above objects can be achieved by the polarizer production method and other techniques described below and have completed the invention.

Thus, the invention is directed to a method for producing a polarizer, comprising:

subjecting a polyvinyl alcohol film to at least a dyeing process, a stretching process and a crosslinking process, wherein the polyvinyl alcohol film has an original width of at least 2300 mm; and performing a cleaning process (1) before the dyeing process, wherein the cleaning process (1) comprises:

feeding the film from a first pinch roll;

allowing the film being fed to pass through at least first and second guide rolls so as to immerse the film in a cleaning bath; and cleaning the film, while stretching the film at a stretch ratio of 1.2 to 2.9 by guiding the film to a second pinch roll and using a difference in peripheral speed between the first and second pinch rolls, both of the first and second guide rolls are placed in the cleaning bath, the length (a) of a pass line of the film between the first and second guide rolls is adjusted to at least 50 cm, and at least the second guide roll uses an expander roll with a face length of at least 2300 mm.

The invention is also directed to a method for producing a polarizer, comprising:

subjecting a polyvinyl alcohol film to at least a dyeing process, a stretching process and a crosslinking process, wherein the polyvinyl alcohol film has an original width of at least 2300 mm; and performing a cleaning process (1) before the dyeing process, wherein the cleaning process (1) comprises:

feeding the film from a first pinch roll;

allowing the film being fed to pass through at least first and second guide rolls so as to immerse the film in a cleaning bath; and cleaning the film, while stretching the film at a stretch ratio of 1.2 to 2.9 by guiding the film to a second pinch roll and using a difference in peripheral speed between the first and second pinch rolls, the first guide roll is placed outside the cleaning bath, the second guide roll is placed in the cleaning bath, the length (b) of a pass line of the film immersed in the cleaning bath between the first and second guide rolls is adjusted to at least 50 cm, and at least the second guide roll uses an expander roll with a face length of at least 2300 mm.

In the method for producing a polarizer, the distance (c) between the lowermost face of the first guide roll placed outside the cleaning bath and the surface of the cleaning bath is preferably from 0.1 cm to 30 cm.

In the method for producing a polarizer, the stretch ratio is preferably from 1.3 to 2.6.

In the method for producing a polarizer, the cleaning bath has preferably a temperature of 20° C. to 45° C.

In the method for producing a polarizer, at least one third guide roll is provided between the second guide roll and the second pinch roll, and the film may be guided through the third guide roll to the second pinch roll.

In the method for producing a polarizer, the cleaning process (1) may also serves as a swelling process.

The method for producing a polarizer comprising the cleaning process (1) further comprises preferably performing another cleaning process (2) after the dyeing process, wherein the cleaning process (2) comprises:

feeding the film from a first pinch roll;

allowing the film being fed to pass through at least first and second guide rolls so as to immerse the film in a cleaning bath; and cleaning the film, while stretching the film at a stretch ratio of 0.995 to 1.2 by guiding the film to a second pinch roll and using a difference in peripheral speed between the first and second pinch rolls, both of the first and second guide rolls are placed in the cleaning bath, the length (a) of a pass line of the film between the first and second guide rolls is adjusted to at least 50 cm, and at least the second guide roll uses an expander roll with a face length of at least 1500 mm.

The method for producing a polarizer comprising the cleaning process (1) further comprises preferably another cleaning process (2) after the dyeing process, wherein the cleaning process (2) comprises:

feeding the film from a first pinch roll;

allowing the film being fed to pass through at least first and second guide rolls so as to immerse the film in a cleaning bath; and cleaning the film, while stretching the film at a stretch ratio of 0.995 to 1.2 by guiding the film to a second pinch roll and using a difference in peripheral speed between the first and second pinch rolls, the first guide roll is placed outside the cleaning bath, the second guide roll is placed in the cleaning bath, the length (b) of a pass line of the film immersed in the cleaning bath between the first and second guide rolls is adjusted to at least 50 cm, and at least the second guide roll uses an expander roll with a face length of at least 1500 mm.

In the cleaning process (2) of the method for producing a polarizer, the distance (c) between the lowermost face of the first guide roll placed outside the cleaning bath and the surface of the cleaning bath is preferably from 0.1 cm to 30 cm.

In the cleaning process (2) of the method for producing a polarizer, the cleaning bath has preferably a temperature of 20° C. to 40° C.

In the cleaning process (2) of the method for producing a polarizer, at least one third guide roll is provided between the second guide roll and the second pinch roll, and the film may be guided through the third guide roll to the second pinch roll.

In the cleaning process (2) of the method for producing a polarizer, the cleaning process (2) is preferably performed after the dyeing, stretching and crosslinking processes are all completed.

In the cleaning process (2) of the method for producing a polarizer, the cleaning bath used in the cleaning process (2) is preferably an aqueous solution containing an iodide.

The invention is also directed to a polarizer produced by the method.

The invention is also directed to a polarizing plate comprising the polarizer and a transparent protective layer provided on at least one side of the polarizer.

The invention is also directed to an optical film comprising a laminate containing at least one piece of the polarizer or the polarizing plate.

The invention is also directed to an image display comprising at least one piece of the polarizer, the polarizing plate or the optical film.

The invention is also directed to a cleaning apparatus for use in a polarizer production method that comprises performing at least a dyeing process, a stretching process and a crosslinking process, comprising:

a cleaning vessel for use in a cleaning process (1) that is performed before the dyeing process;

first and second pinch rolls that are provided on both sides of the cleaning vessel;

guide rolls provided opposite to the first and second pinch rolls, respectively; and first and second guide rolls placed in a cleaning bath between the first and second pinch rolls, wherein the first and second guide rolls are arranged such that the length (a) of a pass line of a film that is allowed to pass therebetween is at least 50 cm, and at least the second guide roll is an expander roll with a face length of at least 2300 mm.

The invention is also directed to a cleaning apparatus for use in a polarizer production method that comprises performing at least a dyeing process, a stretching process and a crosslinking process, comprising:

a cleaning vessel for use in a cleaning process (1) that is performed before the dyeing process;

first and second pinch rolls that are provided on both sides of the cleaning vessel;

guide rolls provided opposite to the first and second pinch rolls, respectively; and first and second guide rolls placed between the first and second pinch rolls, wherein the first guide roll is placed outside a cleaning bath, and the second guide roll is place in the cleaning bath, the first and second guide rolls are arranged such that the length (b) of a pass line of a film that is allowed to pass therebetween and between the surface of the cleaning bath and the second guide roll is at least 50 cm, and at least the second guide roll is an expander roll with a face length of at least 2300 mm.

In the cleaning apparatus, the first guide roll placed outside a cleaning bath is preferably placed in such a position that the distance (c) between its lowermost face and the surface of the cleaning bath is from 0.1 cm to 30 cm.

The cleaning apparatus further may comprise at least one third guide roll placed between the second guide roll and the second pinch roll.

A cleaning system comprises the cleaning apparatus having the cleaning vessel for use in the cleaning process (1) and another cleaning apparatus having another cleaning vessel for use in another cleaning process (2) that is performed after the dyeing process;

the another cleaning apparatus having another cleaning vessel for use in another cleaning process (2) may comprise first and second pinch rolls that are provided on both sides of the cleaning vessel;

guide rolls provided opposite to the first and second pinch rolls, respectively; and first and second guide rolls placed in a cleaning bath and between the first and second pinch rolls, wherein the first and second guide rolls are arranged such that the length (a) of a pass line of a film that is allowed to pass therebetween is at least 50 cm, and at least the second guide roll is an expander roll with a face length of at least 1500 mm.

A cleaning system comprises the cleaning apparatus having the cleaning vessel for use in the cleaning process (1) and another cleaning apparatus having another cleaning vessel for use in another cleaning process (2) that is performed after the dyeing process;

the another cleaning apparatus having another cleaning vessel for use in another cleaning process (2) may comprise first and second pinch rolls that are provided on both sides of the cleaning vessel;

guide rolls provided opposite to the first and second pinch rolls, respectively; and first and second guide rolls placed between the first and second pinch rolls, wherein the first guide roll is placed outside a cleaning bath, and the second guide roll is place in the cleaning bath, the first and second guide rolls are arranged such that the length (b) of a pass line of a film that is allowed to pass therebetween and between the surface of the cleaning bath and the second guide roll is at least 50 cm, and at least the second guide roll is an expander roll with a face length of at least 1500 mm.

In the another cleaning apparatus having the another cleaning vessel for use in another cleaning process (2), the first guide roll placed outside a cleaning bath is preferably placed in such a position that the distance (c) between its lowermost face and the surface of the cleaning bath is from 0.1 cm to 30 cm.

The another cleaning apparatus having the another cleaning vessel for use in another cleaning process (2), further may comprise at least one third guide roll placed between the second guide roll and the second pinch roll.

A wide polyvinyl alcohol film can be easily folded in a cleaning process before a dyeing process (before a swelling process) or in a swelling process. In the method for producing a polarizer according to the invention, therefore, the respective conditions for the cleaning process are so controlled that the above problems can be prevented and that a polarizer with good optical properties can be produced.

In the cleaning process before the dyeing process, the stretch ratio is controlled to be relatively small in the range of 1.2 to 2.9 such that the resulting optical properties cannot be degraded. If the stretch ratio is relatively small, however, a polyvinyl alcohol film can swell with water to have a larger width so that it can be easily folded through a guide roll. In the invention, however, these problems are prevented, because the distance between the first and second guide rolls placed between the first and second pinch rolls is adjusted such that the length of the contact of the moving film with the cleaning bath (the pass line length) is set at 50 cm or more and because an expander roll is used as the second guide roll.

The film folding can occur not only in the cleaning process before the dyeing process or in the swelling process but also in other processes such as a cleaning process with water or an iodide after the dyeing or crosslinking process.

In the cleaning process after the dyeing process according to the invention, the stretch ratio is controlled to be relatively small in the range of 0.995 to 1.2 such that the resulting optical properties cannot be degraded. If the stretch ratio is relatively small, however, film folding or buckling can easily occur. In the invention, however, these problems are prevented, because the distance between the first and second guide rolls placed between the first and second pinch rolls for use in the cleaning process is adjusted such that the length of the contact of the moving film with the cleaning bath (the pass line length) is set at 50 cm or more and because an expander roll is used as the second guide roll.

The combination of the cleaning processes before and after the dyeing process is more effective in producing a polarizer with good optical properties from a polyvinyl alcohol film without causing the problem of film folding or buckling.

BRIEF DESCRIPTION OF THE DRAWINGS

FIG. 1 schematically shows an example of the manufacturing apparatus for use in the cleaning process (1) or (2) of the method for producing a polarizer according to the invention;

FIG. 2 schematically shows another example of the manufacturing apparatus for use in the cleaning process (1) or (2) of the method for producing a polarizer according to the invention;

FIG. 3 schematically shows a further example of the manufacturing apparatus for use in the cleaning process (1) or (2) of the method for producing a polarizer according to the invention;

FIG. 4 schematically shows a further example of the manufacturing apparatus for use in the cleaning process (1) or (2) of the method for producing a polarizer according to the invention;

FIG. 5 schematically shows a further example of the manufacturing apparatus for use in the cleaning process (1) or (2) of the method for producing a polarizer according to the invention;

FIG. 6 is a schematic diagram of an expander roll for use in the method for producing a polarizer according to the invention;

FIG. 7A is a photograph showing film folding at the second pinch roll in the first bath of Comparative Example 4;

FIG. 7B is a photograph showing film folding at the second pinch roll in the first bath of Comparative Example 10;

FIG. 8A is a photograph of a folding mark determined by transmission observation of the polarizing plate obtained in Comparative Example 5;

FIG. 8B is a photograph of a folding mark determined by transmission observation of the polarizing plate obtained in Comparative Example 11;

FIG. 8C is a photograph of a folding mark determined by transmission observation of the polarizing plate obtained in Comparative Example 6; and FIG. 8D is a photograph of a folding mark determined by reflection observation of the polarizing plate obtained in Comparative Example 16.

DESCRIPTION OF REFERENCE MARKS

In the drawings, reference mark 11 represents a first guide roll, 12 a second guide roll, 13 a third guide roll, 21 a first pinch roll, 22 a second pinch roll, a the pass line length of the film between the first and second guide rolls, b the pass line length of the film immersed in a cleaning bath between the first and second guide rolls, c the distance between the lowermost face of the first guide roll and the surface of the cleaning bath, A a cleaning vessel, and B a cleaning bath.

DETAILED DESCRIPTION OF THE PREFERRED EMBODIMENTS

Polyvinyl alcohol or any derivative thereof may be used as a material for the polyvinyl alcohol-based film suited for the polarizer of the invention. Examples of the polyvinyl alcohol derivative include polyvinyl formal, polyvinyl acetal, and those modified with an olefin such as ethylene and propylene, an unsaturated carboxylic acid such as acrylic acid, methacrylic acid and crotonic acid, an alkyl ester thereof, acrylamide, or the like. The polyvinyl alcohol generally has a degree of polymerization of from about 1,000 to about 10,000 and a saponification degree of from about 80 to about 100% by mole.

The polyvinyl alcohol-based film may contain any additive such as a plasticizer or a surface acting agent. Examples of the plasticizer include polyols and condensation products thereof, such as glycerol, diglycerol, triglycerol, ethylene glycol, propylene glycol, and polyethylene glycol. While the plasticizer may be used in any amount, the content of the plasticizer in the polyvinyl alcohol-based film is preferably 20% by weight or less. The film to be used generally has a thickness of about 30 to about 150 μm.

The polyvinyl alcohol film has an original width of at least 2300 mm. A larger original width can more easily cause film folding or buckling. In the invention, however, film folding or buckling can be prevented, even when the original width is at least 2500 mm, still at least 2700 mm, further at least 2900 mm, or further at least 3000 mm. While the original width of the polyvinyl alcohol film has no particular restriction, it is generally at most 4000 mm. In general, the polyvinyl alcohol film to be used can swell by about 10% to about 40% when immersed in water. Specifically, the polyvinyl alcohol film can swell by 10% to 40% in the MD direction (the film feeding direction) and in the TD direction (the width direction), respectively.

The method for producing a polarizer according to the invention includes subjecting the polyvinyl alcohol film to at least a dyeing process, a stretching process and a crosslinking process. The method for producing a polarizer according to the invention also includes a cleaning process (1) before the dyeing process or includes another cleaning process (2) after the dyeing or crosslinking process. The method of the invention preferably includes the cleaning processes (1) and (2).

The dyeing process may include allowing iodine or a dichroic dye to adsorb to the unstretched film or stretched film and aligning the iodine or dichroic dye. The dyeing is generally performed by immersing the film in a dye solution. The dye solution is generally an iodine solution. An aqueous iodine solution for use as the dye solution may contain iodine and iodide ions that are typically derived from potassium iodide or the like serving as a solubilizing aid. Iodine may be used at a concentration of about 0.01 to 0.5% by weight, preferably of about 0.02 to about 0.4% by weight, and potassium iodide may be used at a concentration of about 0.01 to about 10% by weight, preferably of 0.02 to 8% by weight. In the iodine dyeing, the iodine solution generally has a temperature of about 20 to 50° C., preferably of 25 to 40° C. The immersion time is generally from about 10 to about 300 seconds, preferably from 20 to 240 seconds.

The stretching process is generally performed by uniaxial stretching. Stretching is performed in the above mentioned cleaning process (1) or (2), but this stretching is performed independently of stretching performed in the cleaning process (1) or (2). The stretching process may be performed together with the dyeing or crosslinking process. While the stretching process may use any of a wet stretching method and a dry stretching method, a wet stretching method is preferably used. For example, the wet stretching method generally includes stretching in a solution after the dyeing process. Stretching may also be performed together with the crosslinking process. In the case of the dry stretching, examples of the stretching method include an inter-roll stretching method, a heated roll stretching method, and a compression stretching method. In the stretching method, the film to be stretched is generally kept in a heated state. The stretching process may also be performed in a multi-stage manner.

While the stretch ratio may be properly set depending on purpose, the stretch ratio (the total stretch ratio including the stretch ratios in the cleaning processes (1) and (2)) is preferably from about 2 to about 7, more preferably from 4.5 to 6.8, still more preferably from 5 to 6.5.

The crosslinking process is generally performed using a boron compound. The crosslinking process may be performed at any stage. The crosslinking process may be performed together with the stretching process. The crosslinking process may be performed plural times. The boron compound may be boric acid, borax or the like. The boron compound may be used in the form of an aqueous solution or in the form of a water-organic solvent mixture solution. The concentration of boric acid in an aqueous boric acid solution may be from about 2 to about 20% by weight, preferably from 3 to 15% by weight. The aqueous boric acid solution or the like may contain an iodide such as potassium iodide. The crosslinking process may be performed by immersing the polyvinyl alcohol film in an aqueous boric acid solution or by applying the boron compound or the like by coating, spraying or the like. In the crosslinking process, the process temperature is generally at least 30° C., preferably in the range of 50 to 85° C. The process time is generally from 10 to 800 seconds, preferably from about 30 to about 500 seconds.

Each of the dyeing, stretching and crosslinking processes may be performed in a single bath or plural baths. These processes may be each independently performed or may be performed at the same time. For example, if the dyeing bath contains a crosslinking agent, the dyeing and crosslinking processes can be performed at the same time. In this process, stretching may also be performed at the same time.

The method for producing a polarizer according to the invention also includes a cleaning process (1) before the dyeing process. The cleaning process (1) may be performed to serve as the process of allowing the polyvinyl alcohol film to swell. Alternatively, the cleaning process (1) may be performed for its own purpose before a swelling process. The cleaning process (1) may be performed by immersing the polyvinyl alcohol film in an aqueous solution mainly composed of water. The polyvinyl alcohol film, which is a hydrophilic polymer film, can naturally swell when immersed in an aqueous solution. Thus, the cleaning process (1) may be performed to serve as a practical swelling process.

The method for producing a polarizer according to the invention may include another cleaning process (2) after the dyeing process. After the dyeing process, the crosslinking process and/or the stretching process may be performed, and before or after each of these processes, the cleaning (2) may be performed. The cleaning process (2) may also be performed after the dyeing, crosslinking and stretching processes are all completed.

The cleaning processes (1) and (2) in the method for producing a polarizer according to the invention and the apparatuses for use in these processes are described below with reference to the drawings.

For example, the cleaning process (1) is performed using any of the apparatuses shown in FIGS. 1 to 5. Referring to FIGS. 1 to 5, the film (the polyvinyl alcohol film) f being fed is allowed to pass through a first pinch roll 21, then a first guide roll 11 and a second guide roll 12 and immersed in a cleaning bath B and guided to a second pinch roll 22. The film f is cleaned, while it is stretched using a difference between the peripheral speeds of the first and second pinch rolls 21 and 22. A guide roll 31 is provided opposite to the first pinch roll 21, and a guide roll 32 is provided opposite to the second pinch roll 22. The cleaning bath B is contained in a cleaning vessel A.

In the cleaning process (1), the cleaning bath B generally uses water, distilled water or pure water. If the cleaning bath B (a liquid bath) is mainly composed of water, it may contain a small amount of an additive such as a surfactant and an iodide such as potassium iodide, or a small amount of an alcohol or the like. In the cleaning bath, additives such as glycerin and a surfactant are eluted from the polyvinyl alcohol film to the cleaning bath. Thus, the concentration of such additives should preferably be prevented from increasing. Therefore, the cleaning bath is preferably replenished, stirred, filtered, or circulated, as needed. The liquid bath being replenished, filtered or circulated should not directly hit the film. If the water flow directly hits the polyvinyl alcohol film, the possibility of causing uneven swelling in that portion can increase.

In the cleaning process (1), the temperature distribution in the cleaning bath B should preferably be reduced in the width direction, in order to prevent uneven swelling of the polyvinyl alcohol film. A temperature gradient in the flow direction (the film feeding direction) causes no particular problem, as long as the temperature distribution in the width direction is constant. From this point of view, in general, the temperature of the cleaning bath is preferably controlled to about 20 to about 45° C., more preferably to 25 to 40° C. Uneven swelling can cause uneven dyeing of the portion in the dyeing process. Thus, uneven swelling should be prevented. The immersion time is generally from about 10 to about 300 seconds, preferably from 20 to 240 seconds. In order to achieve sufficient swelling, the time from the immersion of the polyvinyl alcohol film to the arrival at the second guide roll is preferably at least 12 seconds and preferably at most 120 seconds in view of productivity.

In the cleaning process (1), the stretching is performed at a stretch ratio of 1.2 to 2.9. In order to produce satisfactory optical properties and to control film folding, the stretch ratio is preferably from 1.3 to 2.6, more preferably from 1.5 to 2.6, still more preferably from 2.0 to 2.4.

In the cleaning process (1), at least the second guide roll 12 uses an expander roll. The face length of the expander roll is at least 2300 mm so as to be equal to or larger than the original width of the polyvinyl alcohol film. The face length of the expander roll is generally at most 1.5 times the width of the original film, because the expansion coefficient of the polyvinyl alcohol film is generally at most 1.5. The expander roll can prevent the film f from causing folding, even when the film f passes through the expander roll before it swells and reaches a saturated state. Thus, the film f does not have to have a saturated state when it passes through the expander roll.

The expander roll has a bended shape as shown in the cross-sectional view of FIG. 6. The camber (the degree of curvature)=h/L may be from 0.005 to 0.10, preferably from 0.01 to 0.06, wherein L is the face length of the expander roll, and h is the height. If the camber is reduced, the film folding-preventing effect can tend to be reduced. If the camber is too large, the film can be easily wrinkled. Therefore, the angle of installation of the expander roll should be slightly adjusted in some cases.

A variety of materials may be used to form the surface of the expander roll. A grippy material such as a rubber is preferred to a metal plated mirror surface.

In FIG. 1, the first guide roll 11 and the second guide roll 12 are both placed in the cleaning bath B, and the length (a) of the pass line of the film between the first and second guide rolls 11 and 12 is adjusted to at least 50 cm. If the pass line length (a) is less than 50 cm, film folding or wrinkling cannot sufficiently be prevented. The pass line length (a) is the distance between the point of final contact of the film f with the first guide roll 11 and the point of first contact of the film f with the guide roll 12. The pass line length (a) is preferably at least 1 m, more preferably at least 1.5 m, still more preferably at least 2 m. The pass line length (a) may be increased to 10 m or more. However, the increase in the pass line length (a) only results in an increase in the size of the apparatus with no particular advantage. In general, therefore, the pass line length (a) is preferably at most 10 m. The first guide roll 11 may be a flat roll or an expander roll.

The length (x) of the pass line between the point where the film f is immersed into the cleaning bath B and the point where the film f comes into contact with the first guide roll 11 is preferably at most 30 cm, more preferably at most 20 cm, still more preferably at most 10 cm. If the pass line length (x) is more than 30 cm, film folding or buckling can easily occur in the film f when the film f passes through the first guide roll 11. Film folding less likely occurs in a case where an expander roll is used as the first guide roll 11 than in a case where a flat roll is used.

In FIG. 2, the first guide roll 11 is placed outside the cleaning bath B, while the second guide roll 12 is placed in the cleaning bath B. The length (b) of the pass line of the film immersed in the cleaning bath between the first and second guide rolls 11 and 12 is adjusted to at least 50 cm. Wrinkling or folding can occur during the passage through the guide roll, because the film f swells with water to cause rapid volume expansion and because contact of the film f with the guide roll during the volume expansion process can interfere with the volume expansion and extension. Since the first guide roll 11 shown in FIG. 2 is not placed in the cleaning bath B, film folding does not occur at the first guide roll 11. Namely, if the guide roll is not placed in the bath, rapid swelling of the film f does not occur so that film folding is prevented. In FIG. 2, the pass line length (b) is adjusted to at least 50 cm.

If the pass line length (b) is less than 50 cm, film folding or wrinkling cannot sufficiently be prevented. The pass line length (b) is the distance between the point of first contact of the film f with the cleaning bath B and the point of first contact of the film f with the second guide roll. The pass line length (b) is preferably at least 1 m, more preferably at least 1.5 m, still more preferably at least 2 m. The pass line length (b) may be increased to 10 m or more. However, the increase in the pass line length (b) only results in an increase in the size of the apparatus with no particular advantage. In general, therefore, the pass line length (b) is preferably at most 10 m. In FIG. 2, the first guide roll 11 may be a flat roll or an expander roll.

In FIG. 2, the distance (c) between the lowermost face of the first guide roll 11 and the surface of the cleaning bath B is preferably from 0.1 to 30 cm. The reduction in the distance (c) leads to an increase in the pass line length (b) in the cleaning bath B between the first guide roll 11 and the second guide roll (expander roll) 12, so that the length of the cleaning vessel A can be effectively utilized. An increase in the distance (c) is not preferred, because it leads to a reduction in the distance between the first guide roll 11 and the second guide roll (expander roll) 12 and to a reduction in the pass line length (b) placed in the cleaning bath B, so that the time of immersion of the film f can be reduced and that the bath length cannot effectively be utilized. The distance (c) is preferably from 0.1 to 20 cm, more preferably from 0.1 to 10 cm. In FIG. 1 or 2, only two guide rolls (the first guide roll 11 and the second guide roll (expander roll) 12) are provided between the first and second pinch rolls. Such a structure requires less maintenance and thus is economical. As shown in FIG. 3, 4 or 5, a third guide roll 13 may also be provided after the second guide roll 12. While a single third guide roll 13 is provided in FIG. 3, 4 or 5, a plurality of guide rolls may be provided between the second guide roll 12 and the second pinch roll 22. The third guide roll is preferably provided, because it can increase the pass length so that the immersion time can easily be controlled. The third guide roll may be placed in or outside the cleaning bath. In FIG. 3 or 4, the third guide roll 13 is placed in the cleaning bath B, while in FIG. 5, it is placed outside the cleaning bath B.

The third guide roll 13 may be any of an expander roll and a flat roll, because the second guide roll 12 (expander roll) prevents film folding so that the third guide roll 13 does not have to effectively serve to prevent folding. When the second roll 12 is a flat roll, film folding cannot be prevented even though the third guide roll 13 is an expander roll. It is because film folding occurs at the second guide roll 12.

The pass line length (y), which is the distance between the point of final contact of the film f with the second guide roll 12 and the point of first contact of the film f with the third guide roll 13, has no particular restriction and does not have to be at least 50 cm. In general, the pass line length (y) is preferably from 40 to 100 cm, more preferably from 50 to 80 cm, in view of the depth of the bath.

The cleaning process (2) may also be performed using the same cleaning apparatus as in the cleaning process (1), such as those shown in FIGS. 1 to 5. The cleaning bath B is contained in the cleaning vessel A. In the cleaning process (2), the cleaning bath B generally uses water or an aqueous solution containing an iodide. In particular, the cleaning process (2) performed after all of the dyeing, crosslinking and stretching processes preferably uses an aqueous solution containing an iodide such as potassium iodide. The iodide-containing aqueous solution preferably has a concentration of about 0.5 to about 10% by weight, more preferably of 1 to 8% by weight.

Generally, in the cleaning process (2), the temperature of the cleaning bath is preferably adjusted to about 20 to about 40° C., more preferably to 25 to 35° C. The immersion time is generally from about 1 to about 120 seconds, preferably from 3 to 90 seconds. In the cleaning process (2), cleaning with water may be performed in combination with cleaning with an iodide-containing aqueous solution. In the cleaning process (2), boric acid or a metal salt such as a zinc salt may also be added.

When the cleaning process (2) is performed after all of the dyeing, crosslinking and stretching processes, a drying process is generally performed. The drying process is generally performed at a temperature of 20 to 75° C., preferably of 25 to 70° C., for about 1 to about 5 minutes. After the drying, a polarizer is obtained. The drying may be performed under the conditions where no deformation of the film or no significant change in hue occurs.

In the cleaning process (2), the stretching is performed at a stretch ratio of 0.995 to 1.2. In order to produce satisfactory optical properties and to control film folding, the stretch ratio is preferably from 0.995 to 1.1, more preferably from 0.995 to 1.05, still more preferably from 0.995 to 1.02.

In the cleaning process (2), at least the second guide roll 12 uses an expander roll. In the cleaning process (2), the face length of the expander roll is at least 1500 mm so as to be equal to or larger than the width of the polyvinyl alcohol film passing through the second pinch roll 22. In general, the face length of the expander roll is at most the original width of the polyvinyl alcohol film to be used.

Also in the cleaning process (2), the camber (degree of curvature)=h/L of the expander roll may be from 0.005 to 0.10, preferably from 0.01 to 0.06, like the cleaning process (1). The expander roll may also use the same material as used in the cleaning process (1).

Also in the cleaning process (2), the pass line length (a) shown in FIG. 1 is adjusted to at least 50 cm, like the cleaning process (1). If the pass line length (a) is less than 50 cm, film folding or wrinkling cannot sufficiently be prevented. The pass line length (a) is preferably at least 1 m, more preferably at least 1.5 m, still more preferably at least 2 m. The pass line length (a) may be increased to 10 m or more. However, the increase in the pass line length (a) only results in an increase in the size of the apparatus with no particular advantage. In general, therefore, the pass line length (a) is preferably at most 10 m.

Also in the cleaning process (2), the pass line length (x) between the point where the film f is immersed into the cleaning bath B and the point where the film f comes into contact with the first guide roll 11 is preferably at most 30 cm, more preferably at most 20 cm, still more preferably at most 10 cm, like the cleaning process (1). Also in the cleaning process (2), the pass line length (b) shown in FIG. 2 is adjusted to at least 50 cm, like the cleaning process (1). The pass line length (b) is preferably at least 1 m, more preferably at least 1.5 m, still more preferably at least 2 m. The pass line length (b) may be increased to 10 m or more. However, the increase in the pass line length (b) only results in an increase in the size of the apparatus with no particular advantage. In general, therefore, the pass line length (b) is preferably at most 10 m.

Concerning the first guide roll 11 shown in FIG. 2, the distance (c) between the lowermost face of the first guide roll 11 and the surface of the cleaning bath B is preferably from 0.1 to 30 cm. The distance (c) is more preferably from 0.1 to 20 cm, still more preferably from 0.1 to 10 cm.

Also in the cleaning process (2) as shown in FIG. 1 or 2, the first guide roll 11 may be a flat roll or an expander roll, like the cleaning process (1). The third guide roll or the like may also be provided in the same manner as in the cleaning process (1).

When the cleaning process (2) is performed after all of the dyeing, crosslinking and stretching processes, a drying process is generally performed. The drying process is generally performed at a temperature of 20 to 75° C., preferably of 25 to 70° C., for about 1 to about 5 minutes. After the drying, a polarizer is obtained. The drying may be performed under the conditions where no deformation of the film or no significant change in hue occurs.

After the washing step, the drying step is generally performed at a temperature of from 20 to 70° C., preferably from 25 to 60° C., for about 3 to about 5 minutes.

The above-described polarizer may be used as a polarizing plate with a transparent protective layer prepared at least on one side thereof using a usual method. The transparent protective layer may be prepared as an application layer by polymers, or a laminated layer of films. Proper transparent materials may be used as a transparent polymer or a film material that forms the transparent protective film, and the material having outstanding transparency, mechanical strength, heat stability and outstanding moisture interception property, etc. may be preferably used. As materials of the above-mentioned protective layer, for example, polyester type polymers, such as polyethylene terephthalate and polyethylene naphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned. The transparent protective layer can be formed as a cured layer made of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. In these films, the retardation is small and the photoelastic coefficient is also small, and thus defects such as unevenness which would otherwise be caused by distortion of the polarizing plate can be prevented. In these films, the moisture permeability is also small, and thus they can have good durability under moistening conditions.

While the thickness of the transparent protective layer may be specified as needed, it should be from about 1 to about 500 μm generally in terms of strength, processibility such as handleability, and thin layer formability, preferably from 1 to 300 μm, more preferably from 5 to 200 μm, most preferably from 40 to 100 μm.

Moreover, it is preferable that the transparent protective layer may have as little coloring as possible. Accordingly, a protection film having a retardation value in a film thickness direction represented by Rth=(nx−ny)×d of from −90 nm to +90 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a retardation value (Rth) of from −90 nm to +90 nm in a thickness direction. The retardation value (Rth) in a thickness direction is preferably from −80 nm to +80 nm, and especially preferably from −70 nm to +70 nm.

In terms of polarization characteristics and durability, the protective film preferably comprises a cellulose-based polymer such as triacetyl cellulose. A triacetyl cellulose film is particularly preferred. The protective film such as a triacetyl cellulose film can have a relatively large retardation Rth in the thickness direction and thus can cause a problem of discoloration. A resin composition containing an alternating copolymer composed of isobutylene and N-methylmaleimide and an acrylonitrile-styrene copolymer can have a retardation Rth of 30 nm or less in the thickness direction and thus can be substantially free from discoloration. If the transparent protective layers are provided on both sides of the polarizer, the front and back transparent protective layers may comprise the same polymer material or different polymer materials.

A hard coat layer may be prepared, or antireflection processing, processing aiming at sticking prevention, diffusion or anti glare may be performed onto the face on which the polarizer of the above described transparent protective film has not been adhered.

In addition, the above-mentioned antireflection layer, sticking prevention layer, diffusion layer, anti glare layer, etc. may be built in the transparent protective layer itself, and also they may be prepared as an optical layer different from the transparent protective layer.

Adhesives are used for adhesion processing of the above described polarizing film and the transparent protective layer. As adhesives, isocyanate derived adhesives, polyvinyl alcohol derived adhesives, gelatin derived adhesives, vinyl polymers derived latex type, aqueous polyesters derived adhesives, etc. may be mentioned. The above-described adhesives are usually used as adhesives comprising aqueous solution, and usually contain solid of 0.5 to 60% by weight.

A polarizing plate of the present invention is manufactured by adhering the above-described transparent protective film and the polarizing film using the above-described adhesives. The application of adhesives may be performed to any of the transparent protective film or the polarizing film, and may be performed to both of them. After adhered, drying process is given and the adhesion layer comprising applied dry layer is formed. Adhering process of the polarizing film and the transparent protective film may be performed using a roll laminator etc. Although a thickness of the adhesion layer is not especially limited, it is usually approximately from 20 to 1000 nm.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transreflective plate, a retardation plate (a half wavelength plate and a quarter wavelength plate included), and a viewing angle compensation film, may be used. Especially preferable polarizing plates are; a reflection type polarizing plate or a transreflective type polarizing plate in which a reflector or a transreflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or perpendicular biaxial stretching and a biaxial stretched film as inclined alignment film etc. may be used. As inclined alignment film, for example, a film obtained using a method in which a heat shrinking film is adhered to a polymer film, and then the combined film is heated and stretched or shrinked under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Moreover, the polarizing plate may consist of multi-layered film of laminated layers of a polarizing plate and two or more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transreflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plate or optical films and, if necessary, lighting system, and by incorporating driving circuit. In the present invention, except that a polarizing plate or optical film by the present invention is used, there is especially no limitation to use any conventional methods. Also any liquid crystal cell of arbitrary type, such as TN type, STN type, IPS type, and VA type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

EXAMPLES

The invention is more specifically described by showing the examples and the comparative examples below.

The materials and the composition of the respective baths used in the respective examples are as shown below.

The polyvinyl alcohol film used was 9P75RS manufactured by Kuraray Co., Ltd. Its width was 3 m. It had an average degree of polymerization of 2400 and a saponification degree of 99.9% by mole.

Water was used as a first bath (swelling bath), whose temperature was adjusted to 30° C.

A second bath (dyeing bath) was prepared by a process including the steps of preparing an aqueous 2% by weight solution of potassium iodide and then adding iodine thereto at a weight ratio of iodine to potassium iodide of 1:40. This composition allows the adjustment of the transmittance of the resulting polarizer to 43.5%. The temperature of the dyeing bath was adjusted to 30° C.

A third bath (crosslinking bath) used was an aqueous solution containing 4% by weight of boric acid and 2% by weight of potassium iodide, whose temperature was adjusted to 35° C.

A fourth bath (crosslinking bath) used was an aqueous solution containing 4% by weight of boric acid and 2% by weight of potassium iodide, whose temperature was adjusted to 60° C.

A fifth bath (cleaning bath) used was an aqueous solution containing 5% by weight of potassium iodide, whose temperature was adjusted to 30° C. The fifth bath has a bath length of 3 m.

The manufacturing apparatus used in the cleaning process (1) has an expander roll with a face length of 3.6 m and a camber (degree of curvature) of 0.02. The manufacturing apparatus used in the cleaning process (2) has an expander roll with a face length of 3 m and a camber (degree of curvature) of 0.025.

Example 1

Cleaning Process (1) (Swelling Process)

The polyvinyl alcohol film shown above was fed to the cleaning apparatus shown in FIG. 1 (in which the above first bath is contained in the cleaning vessel). In the cleaning apparatus, the expander roll was used as the second guide roll. The other guide rolls are all flat rolls. The pass line length (a) was set at 50 cm. The pass line length (x) between the point where the film is immersed into the first bath (swelling bath) and the point where the film comes into contact with the first guide roll was 5 cm. The polyvinyl alcohol film being fed was immersed in the first bath and allowed to swell, while it was uniaxially stretched at a stretch ratio of 2. The immersion time to reach the second guide roll was 16 seconds.

Dyeing Process

The polyvinyl alcohol film was then fed to and immersed in the second bath (dyeing bath) for 53 seconds to be dyed, while it was uniaxially stretched at a stretch ratio of 1.4 (the total stretch ratio: 2.8).

Crosslinking Process

The polyvinyl alcohol film was then fed to and immersed in the third bath (crosslinking bath) for 28 seconds to be crosslinked, while it was uniaxially stretched at a stretch ratio of 1.4 (the total stretch ratio: 3.92). The film was further immersed in the fourth bath (crosslinking bath) for 66 seconds to be crosslinked, while it was uniaxially stretched at a stretch ratio of 1.54 (the total stretch ratio: 6.03).

Cleaning Process (2)

The polyvinyl alcohol film was then fed to the cleaning apparatus shown in FIG. 2 (in which the above fifth bath is contained in the cleaning vessel). In the cleaning apparatus, the expander rolls were used as the first and second guide rolls, respectively. The other guide rolls are all flat rolls. The pass line length (b) was set at 60 cm. The distance (c) between the lowermost face of the first guide roll and the surface of the fifth bath (cleaning bath) was set at 5 cm. The polyvinyl alcohol film being fed was immersed in the fifth bath for 15 seconds and allowed to swell, while it was uniaxially stretched at a stretch ratio of 0.995 (the total stretch ratio: 6).

Drying Process

The film was then dried at 35° C. for 3 minutes so that a polarizer whose moisture content was adjusted to 26% by weight was obtained.

Polarizing Plate

Saponified triacetylcellulose films were bonded with a polyvinyl alcohol adhesive to both sides of the resulting polarizer and then dried at 75° C. for 10 minutes so that a polarizing plate was obtained.

Comparative Example 1

A polarizer and a polarizing plate were prepared using the process and conditions of Example 1, except that a flat roll was used instead as the second guide roll in the cleaning apparatus for the cleaning process (1) and that flat rolls were used instead as the first and second guide rolls in the cleaning apparatus for the cleaning process (2).

Comparative Example 2

A polarizer and a polarizing plate were prepared using the process and conditions of Example 1, except that the pass line length (a) of the cleaning apparatus used in the cleaning process (1) was changed to 30 cm and that the pass line length (b) of the cleaning apparatus used in the cleaning process (2) was changed to 30 cm. In the cleaning process (1), the immersion time to reach the second guide roll was 10 seconds.

Comparative Example 3

A polarizer and a polarizing plate were prepared using the process and conditions of Comparative Example 2, except that a flat roll was used instead as the second guide roll in the cleaning apparatus for the cleaning process (1) and that flat rolls were used instead as the first and second guide rolls in the cleaning apparatus for the cleaning process (2).

Example 2

A polarizer and a polarizing plate were prepared using the process and conditions of Example 1, except that the pass line length (a) of the cleaning apparatus used in the cleaning process (1) was changed to 100 cm; the pass line length (b) of the cleaning apparatus used in the cleaning process (2) was changed to 100 cm; the stretch ratio in the fourth bath (crosslinking bath) in the crosslinking process was changed to 1.52 (the total stretch ratio: 5.96); and the stretch ratio in the cleaning process (2) was changed to 1.01 (the total stretch ratio: 6). In the cleaning process (1), the immersion time to reach the second guide roll was 30 seconds.

Comparative Example 4

A polarizer and a polarizing plate were prepared using the process and conditions of Example 2, except that a flat roll was used instead as the second guide roll in the cleaning apparatus for the cleaning process (1) and that flat rolls were used instead as the first and second guide rolls in the cleaning apparatus for the cleaning process (2).

Example 3

A polarizer and a polarizing plate were prepared using the process and conditions of Example 1, except that the pass line length (a) of the cleaning apparatus used in the cleaning process (1) was changed to 300 cm; the pass line length (b) of the cleaning apparatus used in the cleaning process (2) was changed to 150 cm; the stretch ratio in the fourth bath (crosslinking bath) in the crosslinking process was changed to 1.46 (the total stretch ratio: 5.72); and the stretch ratio in the cleaning process (2) was changed to 1.05 (the total stretch ratio: 6). In the cleaning process (1), the immersion time to reach the second guide roll was 83 seconds.

Comparative Example 5

A polarizer and a polarizing plate were prepared using the process and conditions of Example 3, except that a flat roll was used instead as the second guide roll in the cleaning apparatus for the cleaning process (1) and that flat rolls were used instead as the first and second guide rolls in the cleaning apparatus for the cleaning process (2).

Example 4

A polarizer and a polarizing plate were prepared using the process and conditions of Example 1, except that the pass line length (a) of the cleaning apparatus used in the cleaning process (1) was changed to 400 cm; the pass line length (b) of the cleaning apparatus used in the cleaning process (2) was changed to 200 cm; the stretch ratio in the fourth bath (crosslinking bath) in the crosslinking process was changed to 1.42 (the total stretch ratio: 5.57); and the stretch ratio in the cleaning process (2) was changed to 1.08 (the total stretch ratio: 6). In the cleaning process (1), the immersion time to reach the second guide roll was 110 seconds.

Comparative Example 6

A polarizer and a polarizing plate were prepared using the process and conditions of Example 4, except that a flat roll was used instead as the second guide roll in the cleaning apparatus for the cleaning process (1) and that flat rolls were used instead as the first and second guide rolls in the cleaning apparatus for the cleaning process (2).

Example 5

A polarizer and a polarizing plate were prepared using the process and conditions of Example 1, except that the cleaning processes (1) and (2) were changed as described below.

Cleaning Process (1) (Swelling Process)

The polyvinyl alcohol film shown above was fed to the cleaning apparatus shown in FIG. 2 (in which the above first bath is contained in the cleaning vessel). In the cleaning apparatus, the expander roll was used as the second guide roll. The other guide rolls are all flat rolls. The pass line length (b) was set at 50 cm. The distance (c) between the lowermost face of the first guide roll and the surface of the first bath (cleaning bath) was set at 5 cm. The polyvinyl alcohol film being fed was immersed in the first bath and allowed to swell, while it was uniaxially stretched at a stretch ratio of 2. The immersion time to reach the second guide roll was 13 seconds.

Cleaning Process (2)

The polyvinyl alcohol film was fed to the cleaning apparatus shown in FIG. 5 (in which the above fifth bath is contained in the cleaning vessel). In the cleaning apparatus, expander rolls were used as the first, second and third guide rolls, respectively. The other guide rolls are all flat rolls. The pass line length (b) was set at 60 cm. The distance (c) between the lowermost face of the first guide roll and the surface of the fifth bath (cleaning bath) was set at 5 cm. The distance (c) between the lowermost face of the third guide roll and the surface of the fifth bath (cleaning bath) was set at 5 cm. The polyvinyl alcohol film being fed was immersed in the fifth bath for 18 seconds and allowed to swell, while it was uniaxially stretched at a stretch ratio of 0.995 (the total stretch ratio: 6).

Comparative Example 7

A polarizer and a polarizing plate were prepared using the process of Example 5 and the conditions of Example 1, except that a flat roll was used instead as the second guide roll in the cleaning apparatus for the cleaning process (1) and that flat rolls were used instead as the first, second and third guide rolls in the cleaning apparatus for the cleaning process (2).

Comparative Example 8

A polarizer and a polarizing plate were prepared using the process and conditions of Example 5, except that the pass line length (a) of the cleaning apparatus used in the cleaning process (1) was changed to 30 cm and that the pass line length (b) of the cleaning apparatus used in the cleaning process (2) was changed to 30 cm. In the cleaning process (1), the immersion time to reach the second guide roll was 8 seconds.

Comparative Example 9

A polarizer and a polarizing plate were prepared using the process and conditions of Comparative Example 8, except that a flat roll was used instead as the second guide roll in the cleaning apparatus for the cleaning process (1) and that flat rolls were used instead as the first, second and third guide rolls in the cleaning apparatus for the cleaning process (2).

Example 6

A polarizer and a polarizing plate were prepared using the process and conditions of Example 5, except that the pass line length (a) of the cleaning apparatus used in the cleaning process (1) was changed to 100 cm; the pass line length (b) of the cleaning apparatus used in the cleaning process (2) was changed to 100 cm; the stretch ratio in the fourth bath (crosslinking bath) in the crosslinking process was changed to 1.52 (the total stretch ratio: 5.96); and the stretch ratio in the cleaning process (2) was changed to 1.01 (the total stretch ratio: 6). In the cleaning process (1), the immersion time to reach the second guide roll was 27 seconds.

Comparative Example 10

A polarizer and a polarizing plate were prepared using the process and conditions of Example 6, except that a flat roll was used instead as the second guide roll in the cleaning apparatus for the cleaning process (1) and that flat rolls were used instead as the first, second and third guide rolls in the cleaning apparatus for the cleaning process (2).

Example 7

A polarizer and a polarizing plate were prepared using the process and conditions of Example 5, except that the pass line length (a) of the cleaning apparatus used in the cleaning process (1) was changed to 300 cm; the pass line length (b) of the cleaning apparatus used in the cleaning process (2) was changed to 150 cm; the stretch ratio in the fourth bath (crosslinking bath) in the crosslinking process was changed to 1.46 (the total stretch ratio: 5.72); and the stretch ratio in the cleaning process (2) was changed to 1.05 (the total stretch ratio: 6). In the cleaning process (1), the immersion time to reach the second guide roll was 80 seconds.

Comparative Example 11

A polarizer and a polarizing plate were prepared using the process and conditions of Example 7, except that a flat roll was used instead as the second guide roll in the cleaning apparatus for the cleaning process (1) and that flat rolls were used instead as the first, second and third guide rolls in the cleaning apparatus for the cleaning process (2).

Example 8

A polarizer and a polarizing plate were prepared using the process and conditions of Example 5, except that the pass line length (a) of the cleaning apparatus used in the cleaning process (1) was changed to 400 cm; the pass line length (b) of the cleaning apparatus used in the cleaning process (2) was changed to 200 cm; the stretch ratio in the fourth bath (crosslinking bath) in the crosslinking process was changed to 1.42 (the total stretch ratio: 5.57); and the stretch ratio in the cleaning process (2) was changed to 1.08 (the total stretch ratio: 6). In the cleaning process (1), the immersion time to reach the second guide roll was 107 seconds.

Comparative Example 12

A polarizer and a polarizing plate were prepared using the process and conditions of Example 8, except that a flat roll was used instead as the second guide roll in the cleaning apparatus for the cleaning process (1) and that flat rolls were used instead as the first, second and third guide rolls in the cleaning apparatus for the cleaning process (2).

Example 9

A polarizer and a polarizing plate were prepared using the process and conditions of Example 1, except that the cleaning processes (1) and (2) were changed as described below.
Cleaning Process (1) (Swelling Process)
The polyvinyl alcohol film shown above was fed to the cleaning apparatus shown in FIG. 3 (in which the above first bath is contained in the cleaning vessel). In the cleaning apparatus, expander rolls were used as the first, second and third guide rolls. The other guide rolls are all flat rolls. The pass line length (a) was set at 60 cm. The pass line length (x) and the pass line length (y) were set at 10 cm and 60 cm, respectively. The polyvinyl alcohol film being fed was immersed in the first bath and allowed to swell, while it was uniaxially stretched at a stretch ratio of 2. The immersion time to reach the second guide roll was 14 seconds.
Cleaning Process (2)
The polyvinyl alcohol film was fed to the cleaning apparatus shown in FIG. 3 (in which the above fifth bath is contained in the cleaning vessel). In the cleaning apparatus, expander rolls were used as the first, second and third guide rolls, respectively. The other guide rolls are all flat rolls. The pass line length (a) was set at 60 cm. The pass line length (x) and the pass line length (y) were set at 10 cm and 60 cm, respectively. The polyvinyl alcohol film being fed was immersed in the fifth bath for 10 seconds and allowed to swell, while it was uniaxially stretched at a stretch ratio of 0.995 (the total stretch ratio: 6).

Example 10

A polarizer and a polarizing plate were prepared using the process and conditions of Example 9, except that flat rolls were used instead as the first and third guide rolls in the cleaning apparatus for the cleaning process (1) and that flat rolls were used instead as the first and third guide rolls in the cleaning apparatus for the cleaning process (2).

Comparative Example 13

A polarizer and a polarizing plate were prepared using the process and conditions of Example 9, except that flat rolls were used instead as the first, second and third guide rolls in the cleaning apparatus for the cleaning process (1) and that flat rolls were used instead as the first, second and third guide rolls in the cleaning apparatus for the cleaning process (2).

Comparative Example 14

A polarizer and a polarizing plate were prepared using the process and conditions of Example 9, except that the pass line length (a) and pass line length (y) of the cleaning apparatus used in the cleaning process (1) were changed to 30 cm and 30 cm, respectively, and that the pass line length (a) and pass line length (y) of the cleaning apparatus used in the cleaning process (2) were changed to 30 cm and 30 cm, respectively. The immersion time to reach the second guide roll was 8 seconds.

Comparative Example 15

A polarizer and a polarizing plate were prepared using the process and conditions of Comparative Example 14, except that flat rolls were used instead as the first, second and third guide rolls in the cleaning apparatus for the cleaning process (1) and that flat rolls were used instead as the first, second and third guide rolls in the cleaning apparatus for the cleaning process (2).

Example 11

A polarizer and a polarizing plate were prepared using the process and conditions of Example 9, except that the pass line length (a) and pass line length (y) of the cleaning apparatus used in the cleaning process (1) were changed to 200 cm and 40 cm, respectively; the pass line length (a) and pass line length (y) of the cleaning apparatus used in the cleaning process (2) were changed to 100 cm and 40 cm, respectively; the stretch ratio in the fourth bath (crosslinking bath) in the crosslinking process was changed to 1.52 (the total stretch ratio: 5.96); and the stretch ratio in the cleaning process (2) was changed to 1.01 (the total stretch ratio: 6). The immersion time to reach the second guide roll was 42 seconds.

Example 12

A polarizer and a polarizing plate were prepared using the process and conditions of Example 11, except that flat rolls were used instead as the first, and third guide rolls in the cleaning apparatus for the cleaning process (1) and that flat rolls were used instead as the first, and third guide rolls in the cleaning apparatus for the cleaning process (2).

Comparative Example 16

A polarizer and a polarizing plate were prepared using the process and conditions of Example 11, except that flat rolls were used instead as the first, second and third guide rolls in the cleaning apparatus for the cleaning process (1) and that flat rolls were used instead as the first, second and third guide rolls in the cleaning apparatus for the cleaning process (2).

Example 13

A polarizer and a polarizing plate were prepared using the process and conditions of Example 9, except that the pass line length (a) and pass line length (y) of the cleaning apparatus used in the cleaning process (1) were changed to 200 cm and 200 cm, respectively; the pass line length (a) and pass line length (y) of the cleaning apparatus used in the cleaning process (2) were changed to 200 cm and 30 cm, respectively; the stretch ratio in the fourth bath (crosslinking bath) in the crosslinking process was changed to 1.46 (the total stretch ratio: 5.72); and the stretch ratio in the cleaning process (2) was changed to 1.05 (the total stretch ratio: 6). The immersion time to reach the second guide roll was 42 seconds.

Example 14

A polarizer and a polarizing plate were prepared using the process and conditions of Example 13, except that flat rolls were used instead as the first, and third guide rolls in the cleaning apparatus for the cleaning process (1) and that flat rolls were used instead as the first, and third guide rolls in the cleaning apparatus for the cleaning process (2).

Comparative Example 17

A polarizer and a polarizing plate were prepared using the process and conditions of Example 13, except that flat rolls were used instead as the first, second and third guide rolls in the cleaning apparatus for the cleaning process (1) and that flat rolls were used instead as the first, second and third guide rolls in the cleaning apparatus for the cleaning process (2).

Example 15

A polarizer and a polarizing plate were prepared using the process and conditions of Example 1, except that the cleaning processes (1) and (2) were changed as described below.

Cleaning Process (1) (Swelling Process)

The polyvinyl alcohol film shown above was fed to the cleaning apparatus shown in FIG. 4 (in which the above first bath is contained in the cleaning vessel). In the cleaning apparatus, expander rolls were used as the second and third guide rolls. The other guide rolls are all flat rolls. The pass line length (b) was set at 100 cm. The pass line length (y) was set at 40 cm. The distance (c) between the lowermost face of the first guide roll and the surface of the fifth bath (cleaning bath) was set at 5 cm. The polyvinyl alcohol film being fed was immersed in the first bath and allowed to swell, while it was uniaxially stretched at a stretch ratio of 2. The immersion time to reach the second guide roll was 20 seconds.

Cleaning Process (2)

The polyvinyl alcohol film was fed to the cleaning apparatus shown in FIG. 3 (in which the above fifth bath is contained in the cleaning vessel). In the cleaning apparatus, expander rolls were used as the first, second and third guide rolls, respectively. The other guide rolls are all flat rolls. The pass line length (a) was set at 60 cm. The pass line length (x) and the pass line length (y) were set at 10 cm and 60 cm, respectively. The polyvinyl alcohol film being fed was immersed in the fifth bath for 10 seconds and allowed to swell, while it was uniaxially stretched at a stretch ratio of 0.995 (the total stretch ratio: 6).

Example 16

A polarizer and a polarizing plate were prepared using the process and conditions of Example 15, except that a flat roll was used instead as the third roll in the cleaning apparatus for the cleaning process (1) and that flat rolls were used instead as the first and third guide rolls in the cleaning apparatus for the cleaning process (2).

Comparative Example 18

A polarizer and a polarizing plate were prepared using the process and conditions of Example 15, except that flat rolls were used instead as the second and third guide rolls in the cleaning apparatus for the cleaning process (1) and that flat rolls were used instead as the first, second and third guide rolls in the cleaning apparatus for the cleaning process (2).

Comparative Example 19

A polarizer and a polarizing plate were prepared using the process and conditions of Example 15, except that the pass line length (b) of the cleaning apparatus used in the cleaning process (1) was changed to 30 cm and that the pass line length (a) and pass line length (y) of the cleaning apparatus used in the cleaning process (2) were changed to 30 cm and 30 cm, respectively. The immersion time to reach the second guide roll was 6 seconds.

Comparative Example 20

A polarizer and a polarizing plate were prepared using the process and conditions of Comparative Example 19, except that flat rolls were used instead as the second and third guide rolls in the cleaning apparatus for the cleaning process (1) and that flat rolls were used instead as the first, second and third guide rolls in the cleaning apparatus for the cleaning process (2).

Example 17

A polarizer and a polarizing plate were prepared using the process and conditions of Example 15, except that the pass line length (b) and pass line length (y) of the cleaning apparatus used in the cleaning process (1) were changed to 200 cm and 200 cm, respectively; the pass line length (a) and pass line length (y) of the cleaning apparatus used in the cleaning process (2) were changed to 100 cm and 40 cm, respectively; the stretch ratio in the fourth bath (crosslinking bath) in the crosslinking process was changed to 1.52 (the total stretch ratio: 5.96); and the stretch ratio in the cleaning process (2) was changed to 1.01 (the total stretch ratio: 6). The immersion time to reach the second guide roll was 40 seconds.

Example 18

A polarizer and a polarizing plate were prepared using the process and conditions of Example 17, except that a flat roll was used instead as the third roll in the cleaning apparatus for the cleaning process (1) and that flat rolls were used instead as the first and third guide rolls in the cleaning apparatus for the cleaning process (2).

Comparative Example 21

A polarizer and a polarizing plate were prepared using the process and conditions of Example 17, except that flat rolls were used instead as the second and third rolls in the cleaning apparatus for the cleaning process (1) and that flat rolls were used instead as the first, second and third guide rolls in the cleaning apparatus for the cleaning process (2).

Example 19

A polarizer and a polarizing plate were prepared using the process and conditions of Example 1, except that the cleaning processes (1) and (2) were changed as described below and that the stretch ratio in the crosslinking process was changed.
Cleaning Process (1) (Swelling Process)

The polyvinyl alcohol film shown above was fed to the cleaning apparatus shown in FIG. 1 (in which the above first bath is contained in the cleaning vessel). In the cleaning apparatus, the expander roll was used as the second guide roll. The other guide rolls are all flat rolls. The pass line length (a) was set at 100 cm. The polyvinyl alcohol film being fed was immersed in the first bath and allowed to swell, while it was uniaxially stretched at a stretch ratio of 2. The immersion time to reach the second guide roll was 30 seconds.
Cleaning Process (2)

The polyvinyl alcohol film was fed to the cleaning apparatus shown in FIG. 2 (in which the above fifth bath is contained in the cleaning vessel). In the cleaning apparatus, all the guide rolls are flat rolls. The pass line length (b) was set at 100 cm. The distance (c) between the lowermost face of the first guide roll and the surface of the fifth bath (cleaning bath) was set at 5 cm. The polyvinyl alcohol film being fed was immersed in the fifth bath for 12 seconds and allowed to swell, while it was uniaxially stretched at a stretch ratio of 1.2 (the total stretch ratio: 6).

In the fourth bath for the crosslinking process, the stretch ratio was 1.28 (the total stretch ratio: 5.02).

Comparative Example 22

A polarizer and a polarizing plate were prepared using the process and conditions of Example 19, except that a flat roll was used instead as the second guide roll in the cleaning apparatus for the cleaning process (1).

Comparative Example 23

A polarizer and a polarizing plate were prepared using the process and conditions of Example 1, except that the cleaning processes (1) and (2) were changed as described below and that the stretch ratios in the crosslinking process and other processes were changed.
Cleaning Process (1) (Swelling Process)

The polyvinyl alcohol film shown above was fed to the cleaning apparatus shown in FIG. 1 (in which the above first bath is contained in the cleaning vessel). In the cleaning apparatus, all the guide rolls are flat rolls. The pass line length (a) was set at 100 cm. The polyvinyl alcohol film being fed was immersed in the first bath and allowed to swell, while it was uniaxially stretched at a stretch ratio of 3. The immersion time to reach the second guide roll was 23 seconds.
Cleaning Process (2)

The polyvinyl alcohol film was fed to the cleaning apparatus shown in FIG. 2 (in which the above fifth bath is contained in the cleaning vessel). In the cleaning apparatus, the expander rolls were used as the first and second guide rolls, respectively. The other guide rolls are all flat rolls. The pass line length (b) was set at 100 cm. The distance (c) between the lowermost face of the first guide roll and the surface of the fifth bath (cleaning bath) was set at 5 cm. The polyvinyl alcohol film being fed was immersed in the fifth bath for 12 seconds and allowed to swell, while it was uniaxially stretched at a stretch ratio of 0.995 (the total stretch ratio: 6).

The dyeing process in the second bath (dyeing bath) used a stretch ratio of 1.3 (the total stretch ratio: 3.9); and the crosslinking processes used a stretch ratio of 1.3 (the total stretch ratio: 6.03) in the third bath (crosslinking bath) and a stretch ratio of 1.19 (the total stretch ratio: 6.03) in the fourth bath (crosslinking bath). The resulting polarizing plate was insufficient in optical properties, because the stretch ratio in the cleaning process (1) was as high as 3.

Comparative Example 24

A polarizer and a polarizing plate were prepared using the process and conditions of Example 20, except that flat rolls were used instead as the first and second guide rolls in the cleaning apparatus for the cleaning process (2).

In the method of producing the polarizer in each of the examples and the comparative examples, it was visually determined whether or not film folding occurred in the polyvinyl alcohol film at the part of the second pinch roll or the second guide roll in each of the first bath for the cleaning process (1) and the fifth bath for the cleaning process (2). The case where no film folding occurred was expressed as "o," while the case where film folding occurred was expressed "x." A piece of the polarizing plate was observed to determine a folding mark (a linear stripe in the stretching direction) in the polarizer by transmission and reflection observations with respect to whether or not the polarizer was folded. The case where no folding was determined in the polarizer was expressed as "o," while the case where folding occurred was expressed as "x." These results are shown in Tables 1 to 5. In the Tables, F and Ex represent flat roll and expander roll, respectively.

TABLE 1

| | | Cleaning Process (1) | | | | | | | |
|---|---|---|---|---|---|---|---|---|---|
| | Reference Drawing | Immersion time to Reach Second Guide Roll (sec) | Pass Line Length (x) (cm) | Pass Line Length (a) (cm) | First Guide Roll | Second Guide Roll | Bath Temperature (°C.) | Stretch Ratio (times) | Film Folding in Cleaning Process (1) |
| Example 1 | FIG. 1 | 16 | 5 | 50 | F | Ex | 30 | 2 | ○ |
| Comparative Example 1 | FIG. 1 | 16 | 5 | 50 | F | F | 30 | 2 | X |
| Comparative Example 2 | FIG. 1 | 10 | 5 | 30 | F | Ex | 30 | 2 | X *1 |
| Comparative Example 3 | FIG. 1 | 10 | 5 | 30 | F | F | 30 | 2 | X *1 |
| Example 2 | FIG. 1 | 30 | 5 | 100 | F | Ex | 30 | 2 | ○ |
| Comparative Example 4 | FIG. 1 | 30 | 5 | 100 | F | F | 30 | 2 | X |
| Example 3 | FIG. 1 | 83 | 5 | 300 | F | Ex | 30 | 2 | ○ |
| Comparative Example 5 | FIG. 1 | 83 | 5 | 300 | F | F | 30 | 2 | X |
| Example 4 | FIG. 1 | 110 | 5 | 400 | F | Ex | 30 | 2 | ○ |
| Comparative Example 6 | FIG. 1 | 110 | 5 | 400 | F | F | 30 | 2 | X |

| | | Cleaning Process (2) | | | | | | |
|---|---|---|---|---|---|---|---|---|
| | Reference Drawing | Distance (c) Between First Guide Roll and Liquid Surface (cm) | Pass Line Length (b) (cm) | First and Second Guide Rolls | Bath Temperature (°C.) | Stretch Ratio (times) | Film Folding in Cleaning Process (2) | Determination of Film Folding in Polarizing Plate |
| Example 1 | FIG. 2 | 5 | 60 | Ex | 30 | 0.995 | ○ | ○ |
| Comparative Example 1 | FIG. 2 | 5 | 60 | F | 30 | 0.995 | X | X |
| Comparative Example 2 | FIG. 2 | 5 | 30 | Ex | 30 | 0.995 | X | X |
| Comparative Example 3 | FIG. 2 | 5 | 30 | F | 30 | 0.995 | X | X |
| Example 2 | FIG. 2 | 5 | 100 | Ex | 30 | 1.01 | ○ | ○ |
| Comparative Example 4 | FIG. 2 | 5 | 100 | F | 30 | 1.01 | X | X |
| Example 3 | FIG. 2 | 5 | 150 | Ex | 30 | 1.05 | ○ | ○ |
| Comparative Example 5 | FIG. 2 | 5 | 150 | F | 30 | 1.05 | X | X |
| Example 4 | FIG. 2 | 5 | 200 | Ex | 30 | 1.08 | ○ | ○ |
| Comparative Example 6 | FIG. 2 | 5 | 200 | F | 30 | 1.08 | X | X |

*1: Since the swelling time is short, swelling is uneven so that wrinkling occurs in the film.

TABLE 2

| | | Cleaning Process (1) | | | | | | | | |
|---|---|---|---|---|---|---|---|---|---|---|
| | Reference Drawing | Immersion time to Reach Second Guide Roll (sec) | Pass Line Length (b) (cm) | First Guide Roll | Second Guide Roll | Distance (c) Between First Guide Roll and Liquid Surface (cm) | Bath Temperature (°C.) | Stretch Ratio (times) | Film Folding in Cleaning Process (1) |
| Example 5 | FIG. 2 | 13 | 50 | F | Ex | 5 | 30 | 2 | ○ |
| Comparative Example 7 | FIG. 2 | 13 | 50 | F | F | 5 | 30 | 2 | X |
| Comparative Example 8 | FIG. 2 | 8 | 30 | F | Ex | 5 | 30 | 2 | X *1 |
| Comparative Example 9 | FIG. 2 | 8 | 30 | F | F | 5 | 30 | 2 | X *1 |
| Example 6 | FIG. 2 | 27 | 100 | F | Ex | 5 | 30 | 2 | ○ |
| Comparative Example 10 | FIG. 2 | 27 | 100 | F | F | 5 | 30 | 2 | X |
| Example 7 | FIG. 2 | 80 | 300 | F | Ex | 5 | 30 | 2 | ○ |
| Comparative Example 11 | FIG. 2 | 80 | 300 | F | F | 5 | 30 | 2 | X |

TABLE 2-continued

| | Reference Drawing | | | | | | | | | |
|---|---|---|---|---|---|---|---|---|---|---|
| Example 8 | FIG. 2 | 107 | 400 | F | Ex | 5 | 30 | 2 | ○ | |
| Comparative Example 12 | FIG. 2 | 107 | 400 | F | F | 5 | 30 | 2 | X | |

| | | Cleaning Process (2) | | | | | Film Folding in Cleaning Process (2) | Determination of Film Folding in Polarizing Plate |
|---|---|---|---|---|---|---|---|---|
| | Reference Drawing | Distance (c) Between First Guide Roll and Liquid Surface (cm) | Pass Line Length (b) (cm) | First, Second and Third Guide Rolls | Bath Temperature (° C.) | Stretch Ratio (times) | | |
| Example 5 | FIG. 5 | 5 | 60 | Ex | 30 | 0.995 | ○ | ○ |
| Comparative Example 7 | FIG. 5 | 5 | 60 | F | 30 | 0.995 | X | X |
| Comparative Example 8 | FIG. 5 | 5 | 30 | Ex | 30 | 0.995 | X | X |
| Comparative Example 9 | FIG. 5 | 5 | 30 | F | 30 | 0.995 | X | X |
| Example 6 | FIG. 5 | 5 | 100 | Ex | 30 | 1.01 | ○ | ○ |
| Comparative Example 10 | FIG. 5 | 5 | 100 | F | 30 | 1.01 | X | X |
| Example 7 | FIG. 5 | 5 | 150 | Ex | 30 | 1.05 | ○ | ○ |
| Comparative Example 11 | FIG. 5 | 5 | 150 | F | 30 | 1.05 | X | X |
| Example 8 | FIG. 5 | 5 | 200 | Ex | 30 | 1.08 | ○ | ○ |
| Comparative Example 12 | FIG. 5 | 5 | 200 | F | 30 | 1.08 | X | X |

TABLE 3

| | | Cleaning Process (1) | | | | | | | | | | |
|---|---|---|---|---|---|---|---|---|---|---|---|---|
| | Reference Drawing | Immersion time to Reach Second Guide Roll (sec) | Pass Line Length (x) (cm) | Pass Line Length (a) (cm) | Pass Line Length (y) (cm) | First Guide Roll | Second Guide Roll | Third Guide Roll | Bath Temperature (° C.) | Stretch Ratio (times) | Film Folding in Cleaning Process (1) |
| Example 9 | FIG. 3 | 14 | 10 | 60 | 60 | Ex | Ex | Ex | 30 | 2 | ○ |
| Example 10 | FIG. 3 | 14 | 10 | 60 | 60 | F | Ex | F | 30 | 2 | ○ |
| Comparative Example 13 | FIG. 3 | 14 | 10 | 60 | 60 | F | F | F | 30 | 2 | X |
| Comparative Example 14 | FIG. 3 | 8 | 10 | 30 | 30 | Ex | Ex | Ex | 30 | 2 | X |
| Comparative Example 15 | FIG. 3 | 8 | 10 | 30 | 30 | F | F | F | 30 | 2 | X |
| Example 11 | FIG. 3 | 42 | 10 | 200 | 40 | Ex | Ex | Ex | 30 | 2 | ○ |
| Example 12 | FIG. 3 | 42 | 10 | 200 | 40 | F | Ex | F | 30 | 2 | ○ |
| Comparative Example 16 | FIG. 3 | 42 | 10 | 200 | 40 | F | F | F | 30 | 2 | X |
| Example 13 | FIG. 3 | 42 | 10 | 200 | 200 | Ex | Ex | Ex | 30 | 2 | ○ |
| Example 14 | FIG. 3 | 42 | 10 | 200 | 200 | F | Ex | F | 30 | 2 | ○ |
| Comparative Example 17 | FIG. 3 | 42 | 10 | 200 | 200 | F | F | F | 30 | 2 | X |

| | | Cleaning Process (2) | | | | | | | | Film Folding in Cleaning Process (2) | Determination of Film Folding in Polarizing Plate |
|---|---|---|---|---|---|---|---|---|---|---|---|
| | Reference Drawing | Pass Line Length (x) (cm) | Pass Line Length (a) (cm) | Pass Line Length (y) (cm) | First Guide Roll | Second Guide Roll | Third Guide Roll | Bath Temperature (° C.) | Stretch Ratio (times) | | |
| Example 9 | FIG. 3 | 10 | 60 | 60 | Ex | Ex | Ex | 30 | 0.995 | ○ | ○ |
| Example 10 | FIG. 3 | 10 | 60 | 60 | F | Ex | F | 30 | 0.995 | ○ | ○ |
| Comparative Example 13 | FIG. 3 | 10 | 60 | 60 | F | F | F | 30 | 0.995 | X | X |
| Comparative Example 14 | FIG. 3 | 10 | 30 | 30 | Ex | Ex | Ex | 30 | 0.995 | X | X |
| Comparative Example 15 | FIG. 3 | 10 | 30 | 30 | F | F | F | 30 | 0.995 | X | X |
| Example 11 | FIG. 3 | 10 | 100 | 40 | Ex | Ex | Ex | 30 | 1.01 | ○ | ○ |
| Example 12 | FIG. 3 | 10 | 100 | 40 | F | Ex | F | 30 | 1.01 | ○ | ○ |
| Comparative Example 16 | FIG. 3 | 10 | 100 | 40 | F | F | F | 30 | 1.01 | X | X |
| Example 13 | FIG. 3 | 10 | 200 | 30 | Ex | Ex | Ex | 30 | 1.05 | ○ | ○ |
| Example 14 | FIG. 3 | 10 | 200 | 30 | F | Ex | F | 30 | 1.05 | ○ | ○ |

TABLE 3-continued

| | | | | | | | | | | | | |
|---|---|---|---|---|---|---|---|---|---|---|---|---|
| Comparative Example 17 | FIG. 3 | 10 | 200 | 30 | F | F | F | | 30 | 1.05 | X | X |

TABLE 4

| | | Cleaning Process (1) | | | | | | | | | |
|---|---|---|---|---|---|---|---|---|---|---|---|
| | Reference Drawing | Immersion time to Reach Second Guide Roll (sec) | Distance (c) Between First Guide Roll and Liquid Surface (cm) | Pass Line Length (b) (cm) | Pass Line Length (y) (cm) | First Guide Roll | Second Guide Roll | Third Guide Roll | Bath Temperature (° C.) | Stretch Ratio (times) | Film Folding in Cleaning Process (1) |
| Example 15 | FIG. 4 | 20 | 5 | 100 | 40 | F | Ex | Ex | 30 | 2 | ○ |
| Example 16 | FIG. 4 | 20 | 5 | 100 | 40 | F | Ex | F | 35 | 2 | ○ |
| Comparative Example 18 | FIG. 4 | 20 | 5 | 100 | 40 | F | F | F | 35 | 2 | X |
| Comparative Example 19 | FIG. 4 | 6 | 5 | 30 | 40 | F | Ex | Ex | 30 | 2 | X |
| Comparative Example 20 | FIG. 4 | 6 | 5 | 30 | 40 | F | F | F | 35 | 2 | X |
| Example 17 | FIG. 4 | 40 | 5 | 200 | 200 | F | Ex | Ex | 30 | 2 | ○ |
| Example 18 | FIG. 4 | 40 | 5 | 200 | 200 | F | Ex | F | 35 | 2 | ○ |
| Comparative Example 21 | FIG. 4 | 40 | 5 | 200 | 200 | F | F | F | 35 | 2 | X |

| | | Cleaning Process (2) | | | | | | | | Film Folding in Cleaning Process (2) | Determination of Film Folding in Polarizing Plate |
|---|---|---|---|---|---|---|---|---|---|---|---|
| | Reference Drawing | Pass Line Length (x) (cm) | Pass Line Length (a) (cm) | Pass Line Length (y) (cm) | First Guide Roll | Second Guide Roll | Third Guide Roll | Bath Temperature (° C.) | Stretch Ratio (times) | | |
| Example 15 | FIG. 3 | 10 | 60 | 60 | Ex | Ex | Ex | 30 | 0.995 | ○ | ○ |
| Example 16 | FIG. 3 | 10 | 60 | 60 | F | Ex | F | 30 | 0.995 | ○ | ○ |
| Comparative Example 18 | FIG. 3 | 10 | 60 | 60 | F | F | F | 30 | 0.995 | X | X |
| Comparative Example 19 | FIG. 3 | 10 | 30 | 30 | Ex | Ex | Ex | 30 | 0.995 | X | X |
| Comparative Example 20 | FIG. 3 | 10 | 30 | 30 | F | F | F | 30 | 0.995 | X | X |
| Example 17 | FIG. 3 | 10 | 100 | 40 | Ex | Ex | Ex | 30 | 1.01 | ○ | ○ |
| Example 18 | FIG. 3 | 10 | 100 | 40 | F | Ex | F | 30 | 1.01 | ○ | ○ |
| Comparative Example 21 | FIG. 3 | 10 | 100 | 40 | F | F | F | 30 | 1.01 | X | X |

TABLE 5

| | | Cleaning Process (1) | | | | | | | |
|---|---|---|---|---|---|---|---|---|---|
| | Reference Drawing | Immersion time to Reach Second Guide Roll (sec) | Pass Line Length (x) (cm) | Pass Line Length (a) (cm) | First Guide Roll | Second Guide Roll | Bath Temperature (° C.) | Stretch Ratio (times) | Film Folding Cleaning Process (1) |
| Example 19 | FIG. 1 | 30 | 5 | 100 | F | Ex | 30 | 2 | ○ |
| Comparative Example 22 | FIG. 1 | 30 | 5 | 100 | F | F | 30 | 2 | X |
| Comparative Example 23 | FIG. 1 | 23 | 5 | 100 | F | F | 30 | 3 | ○ |
| Comparative Example 24 | FIG. 1 | 23 | 5 | 100 | F | F | 30 | 3 | ○ |

TABLE 5-continued

| | | Cleaning Process (2) | | | | Film | |
|---|---|---|---|---|---|---|---|
| | Reference Drawing | Distance (c) Between First Guide Roll and Liquid Surface (cm) | Pass Line Length (b) (cm) | First and Second Guide Rolls | Bath Temperature (° C.) | Stretch Ratio (times) | Folding in Cleaning Process (2) | Determination of Film Folding in Polarizing Plate |
| Example 19 | FIG. 2 | 5 | 100 | F | 30 | 1.2 | ○ | ○ |
| Comparative Example 22 | FIG. 2 | 5 | 100 | F | 30 | 1.2 | ○ | X |
| Comparative Example 23 | FIG. 2 | 5 | 100 | Ex | 30 | 0.995 | ○ | ○ |
| Comparative Example 24 | FIG. 2 | 5 | 100 | F | 30 | 0.995 | X | X |

FIGS. 7A and 7B (Photographs Nos. 1 and 2) show typical examples of the folding (buckling) of the polyvinyl alcohol film. FIG. 7A shows film folding at the second pinch roll in the first bath of Comparative Example 4. FIG. 7B shows film folding at the second pinch roll in the first bath of Comparative Example 10.

FIGS. 8A to 8D are photographs showing typical examples of the folded polarizer and the folding mark observed in the polarizing plates. FIGS. 8A to 8C show cases where film folding was determined by the transmission observation of the polarizers. FIG. 8D shows a case where there was only a folding mark on the polarizer, and the folding mark was not determinable by the transmission observation of the polarizing plate, while it was determined by the reflection of fluorescence or the like from the polarizing plate. FIGS. 8A, 8B, 8C, and 8D show the polarizing plates obtained in Comparative Examples 5, 11, 6, and 16, respectively.

What is claimed is:

1. A method for producing a polarizer, comprising:
    subjecting a polyvinyl alcohol film to at least a dyeing process, a stretching process and a crosslinking process, wherein the polyvinyl alcohol film has an original width of at least 2300 mm; and
    performing a cleaning process (1) before the dyeing process, wherein the cleaning process (1) comprises:
    feeding the film from a first pinch roll;
    allowing the film being fed to pass through at least first and second guide rolls so as to immerse the film in a cleaning bath; and
    cleaning the film, while stretching the film at a stretch ratio of 1.2 to 2.9 by guiding the film to a second pinch roll and using a difference in peripheral speed between the first and second pinch rolls,
    the first guide roll is placed outside the cleaning bath and is arranged subsequent to the first pinch roll,
    the second guide roll is placed in the cleaning bath,
    the length (b) of a pass line of the film immersed in the cleaning bath between the first and second guide rolls is adjusted to be 50 cm to 10 m,
    the distance (c) between the lowermost face of the first guide roll and the surface of the cleaning bath is from 0.1 cm to 30 cm, and
    at least the second guide roll uses an expander roll with a face length of 2300 mm or more and equal to or less than 1.5 times the original width.

2. The method according to claim 1, wherein the stretch ratio is from 1.3 to 2.6.

3. The method according to claim 1, wherein the cleaning bath has a temperature of 20° C. to 45° C.

4. The method according to claim 1, wherein at least one third guide roll is provided between the second guide roll and the second pinch roll, and the film is guided through the third guide roll to the second pinch roll.

5. The method according to claim 1, wherein the cleaning process (1) also serves as a swelling process.

6. The method according to claim 1, further comprising performing another cleaning process (2) after the dyeing process, wherein
    the cleaning process (2) comprises:
    feeding the film from a first pinch roll (2);
    allowing the film being fed to pass through at least first guide roll (2) and second guide roll (2) so as to immerse the film in a cleaning bath (2); and
    cleaning the film, while stretching the film at a stretch ratio of 0.995 to 1.2 by guiding the film to a second pinch roll (2) and using a difference in peripheral speed between the first and second pinch rolls,
    both of the first and second guide rolls are placed in the cleaning bath,
    the length (a) of a pass line of the film between the first guide roll (2) and the second guide roll (2) is adjusted to at least 50 cm, and
    at least the second guide roll (2) uses an expander roll (2) with a face length of at least 1500 mm.

7. The method according to claim 1, further comprising another cleaning process (2) after the dyeing process, wherein the cleaning process (2) comprises:
    feeding the film from a first pinch roll (2);
    allowing the film being fed to pass through at least first guide roll (2) and second guide roll (2) so as to immerse the film in a cleaning bath; and
    cleaning the film, while stretching the film at a stretch ratio of 0.995 to 1.2 by guiding the film to a second pinch roll (2) and using a difference in peripheral speed between the first and second pinch rolls,
    the first guide roll is placed outside the cleaning bath,
    the second guide roll is placed in the cleaning bath,
    the length (b) of a pass line of the film immersed in the cleaning bath between the first guide roll (2) and the second guide roll (2) is adjusted to at least 50 cm, and
    at least the second guide roll (2) uses an expander roll (2) with a face length of at least 1500 mm.

8. The method according to claim 7, wherein the distance (c) between the lowermost face of the first guide roll (2) and the surface of the cleaning bath (2) is from 0.1 cm to 30 cm.

9. The method according to claim 6, wherein the cleaning bath (2) has a temperature of 20° C. to 40° C.

10. The method according to claim 6, wherein at least one third guide roll (2) is provided between the second guide roll (2) and the second pinch roll (2), and the film is guided through the third guide roll (2) to the second pinch roll (2).

11. The method according to claim 6, wherein the cleaning process (2) is performed after the dyeing, stretching and crosslinking processes are all completed.

12. The method according to claim 6, wherein the cleaning bath used in the cleaning process (2) is an aqueous solution containing an iodide.

13. The method according to claim 7, wherein the cleaning bath (2) has a temperature of 20° C. to 45° C.

14. The method according to claim 7, wherein at least one third guide roll (2) is provided between the second guide roll (2) and the second pinch roll (2), and the film is guided through the third guide roll (2) to the second pinch roll (2).

15. The method according to claim 7, wherein the cleaning process (2) is performed after the dyeing, stretching and crosslinking processes are all completed.

16. The method according to claim 7, wherein the cleaning bath used in the cleaning process (2) is an aqueous solution containing an iodide.

17. The method according to claim 1, wherein the cleaning bath comprises a water as a primary component and a second component selected from the group consisting of a surface active compound, an iodide compound and an alcohol.

18. The method according to claim 1, wherein
the film is placed on a lower side of the first guide roll.

19. The method according to claim 1, a camber (degree of curvature)=h/L is from 0.01 to 0.06, wherein L is the face length of the expander roll, and h is the height of the expander roll.

* * * * *